(12) United States Patent
Farkas

(10) Patent No.: US 8,667,074 B1
(45) Date of Patent: Mar. 4, 2014

(54) SYSTEMS AND METHODS FOR EMAIL TRACKING AND EMAIL SPAM REDUCTION USING DYNAMIC EMAIL ADDRESSING SCHEMES

(71) Applicant: Bradford L. Farkas, New York, NY (US)

(72) Inventor: Bradford L. Farkas, New York, NY (US)

( * ) Notice: Subject to any disclaimer, the term of this patent is extended or adjusted under 35 U.S.C. 154(b) by 4 days.

(21) Appl. No.: 13/787,097

(22) Filed: Mar. 6, 2013

Related U.S. Application Data

(60) Provisional application No. 61/699,352, filed on Sep. 11, 2012.

(51) Int. Cl.
*G06F 15/16* (2006.01)

(52) U.S. Cl.
USPC ....................................................... 709/206

(58) Field of Classification Search
USPC ....................................................... 709/206
See application file for complete search history.

(56) References Cited

U.S. PATENT DOCUMENTS

| | | | |
|---|---|---|---|
| 6,708,205 B2 | 3/2004 | Sheldon | |
| 7,136,932 B1 | 11/2006 | Schneider | |
| 7,290,035 B2 | 10/2007 | Mattathil | |
| 7,349,827 B1 | 3/2008 | Heller | |
| 7,367,048 B2 | 4/2008 | Kelley | |
| 7,562,118 B2 | 7/2009 | Fellenstein | |
| 7,564,953 B2 | 7/2009 | Ethier | |
| 7,603,425 B2 | 10/2009 | DiPlacido | |
| 7,720,919 B2 | 5/2010 | Khouri | |
| 7,774,414 B2 | 8/2010 | Shah | |
| 7,778,926 B1 | 8/2010 | Grinchenko | |
| 7,783,741 B2 | 8/2010 | Hardt | |
| 7,849,140 B2 | 12/2010 | Abdel-Aziz | |
| 7,933,957 B2 | 4/2011 | Daniell | |
| 8,041,769 B2 | 10/2011 | Shraim | |
| 8,055,716 B2 | 11/2011 | Morgan | |
| 8,230,020 B2 | 7/2012 | Vill | |
| 8,239,471 B2 | 8/2012 | McIsaac | |
| 8,458,264 B1 * | 6/2013 | Lee et al. | 709/206 |
| 2002/0073233 A1 | 6/2002 | Gross | |
| 2005/0010482 A1 | 1/2005 | Maxson | |
| 2005/0204064 A1 | 9/2005 | Ruiz | |
| 2005/0210107 A1 | 9/2005 | Mora | |
| 2005/0216567 A1 | 9/2005 | Ruiz | |

(Continued)

OTHER PUBLICATIONS

Crocker, IETF RFC 822, retrieved Feb. 3, 2013 from http://tools.ietf.org/html/rfc822.

(Continued)

*Primary Examiner* — David X Yi
(74) *Attorney, Agent, or Firm* — Puget Patent; Michael Gibbons

(57) ABSTRACT

An email redirection server handles email sent by subscribers or intended for subscribers, obfuscating the subscriber's identity through replacement of the subscriber's native email address with a proxy address in the message header and forwarding the email with only the proxy address. Acquiring a proxy address includes assignment by the email redirection server of a child domain in the DNS namespace for the subscriber's exclusive use. When a subscriber intends to send an email to a particular recipient without revealing the subscriber's native email address to the particular recipient, the subscriber addresses the message by putting the recipient's full email address in the local part of the "To" field, replacing the "@" symbol with a known replacement character, and placing the subscriber's assigned subdomain in the domain part of the "To" field, assuring that the email gets to the email redirection server for appropriate readdressing and forwarding.

17 Claims, 21 Drawing Sheets

(56) References Cited

U.S. PATENT DOCUMENTS

| | | |
|---|---|---|
| 2006/0036696 A1 | 2/2006 | Maresh |
| 2006/0218289 A1 | 9/2006 | Assad |
| 2006/0259556 A1 | 11/2006 | Auhagen |
| 2007/0005976 A1* | 1/2007 | Riittinen ................... 713/175 |
| 2007/0011253 A1* | 1/2007 | Taylor ...................... 709/206 |
| 2007/0107059 A1 | 5/2007 | Chasin et al. |
| 2007/0118904 A1* | 5/2007 | Goodman et al. ............. 726/22 |
| 2007/0136808 A1 | 6/2007 | Xiong |
| 2008/0040133 A1 | 2/2008 | Foth |
| 2008/0195665 A1 | 8/2008 | Mason |
| 2009/0300012 A1 | 12/2009 | Levow |
| 2010/0036725 A1 | 2/2010 | Turakhia |
| 2010/0153535 A1 | 6/2010 | Thayer |
| 2012/0011357 A1 | 1/2012 | Finlay |

OTHER PUBLICATIONS

Resnick, IETF RFC 2822, retrieved Feb. 3, 2013 from http://tools.ietf.org/html/rfc2822.

Postel, IETF RFC 821, retrieved Feb. 3, 2013 from http://tools.ietf.org/html/rfc821.

Klensin, IETF RFC 2821, retrieved Feb. 3, 2013 from http://tools.ietf.org/html/rfc2821.

* cited by examiner

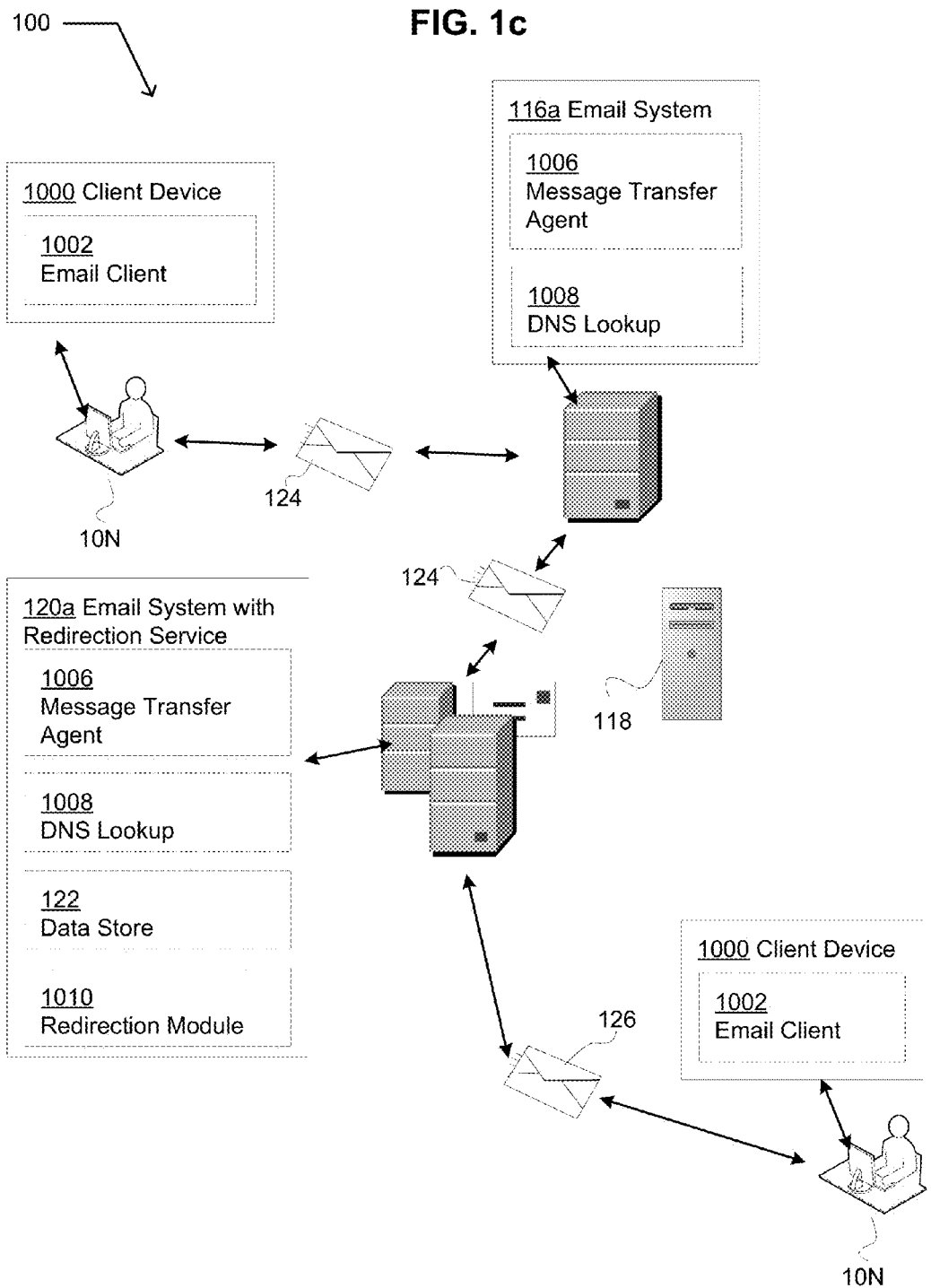

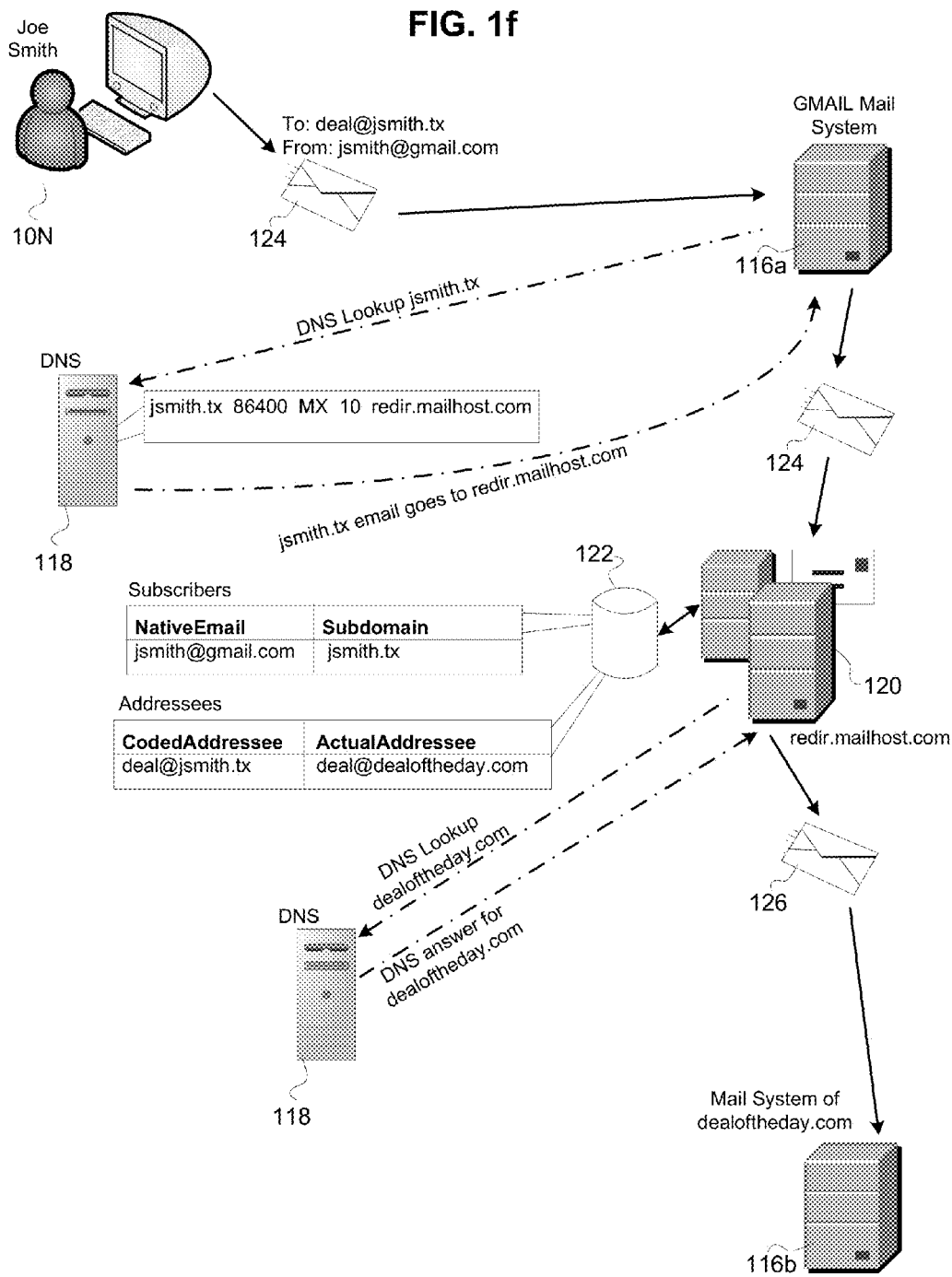

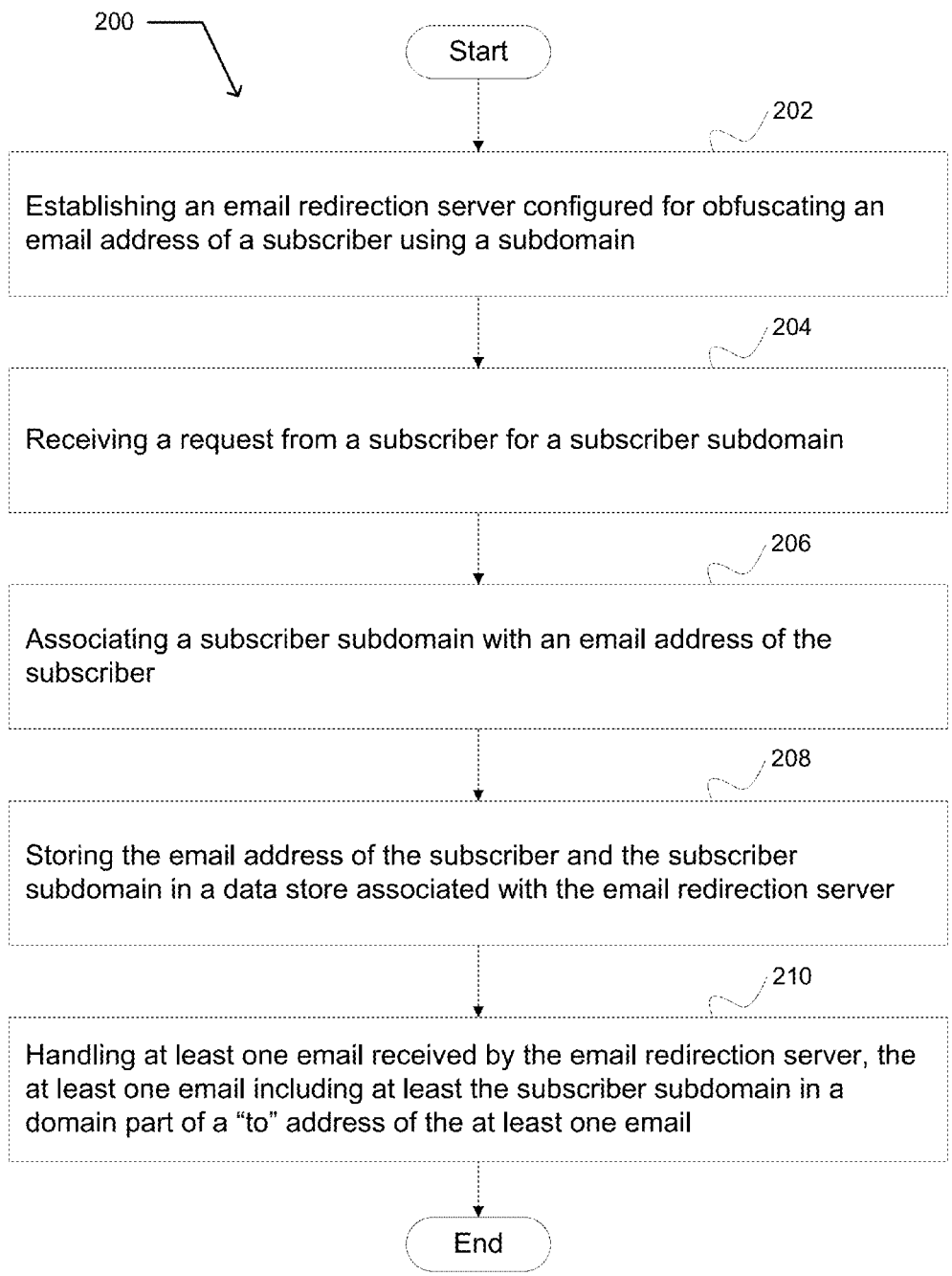

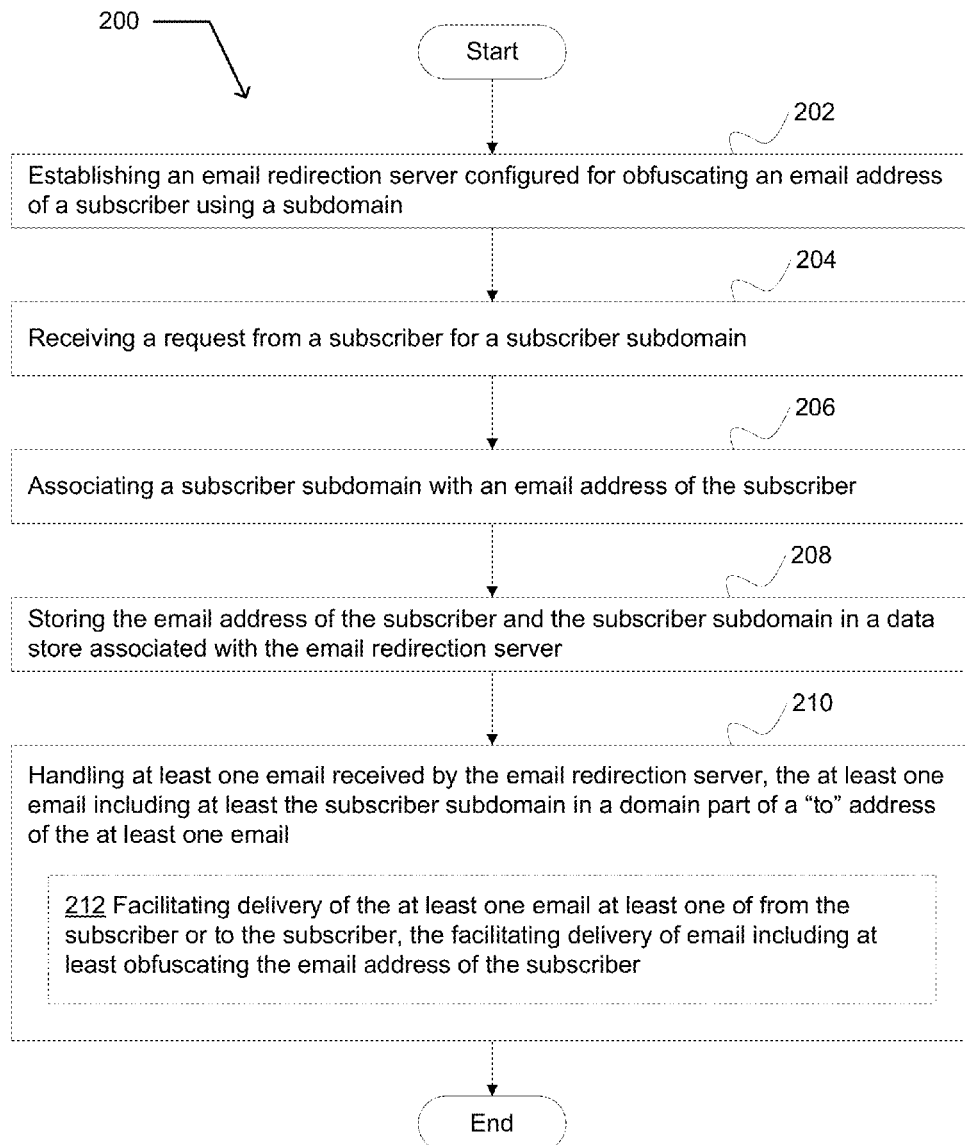

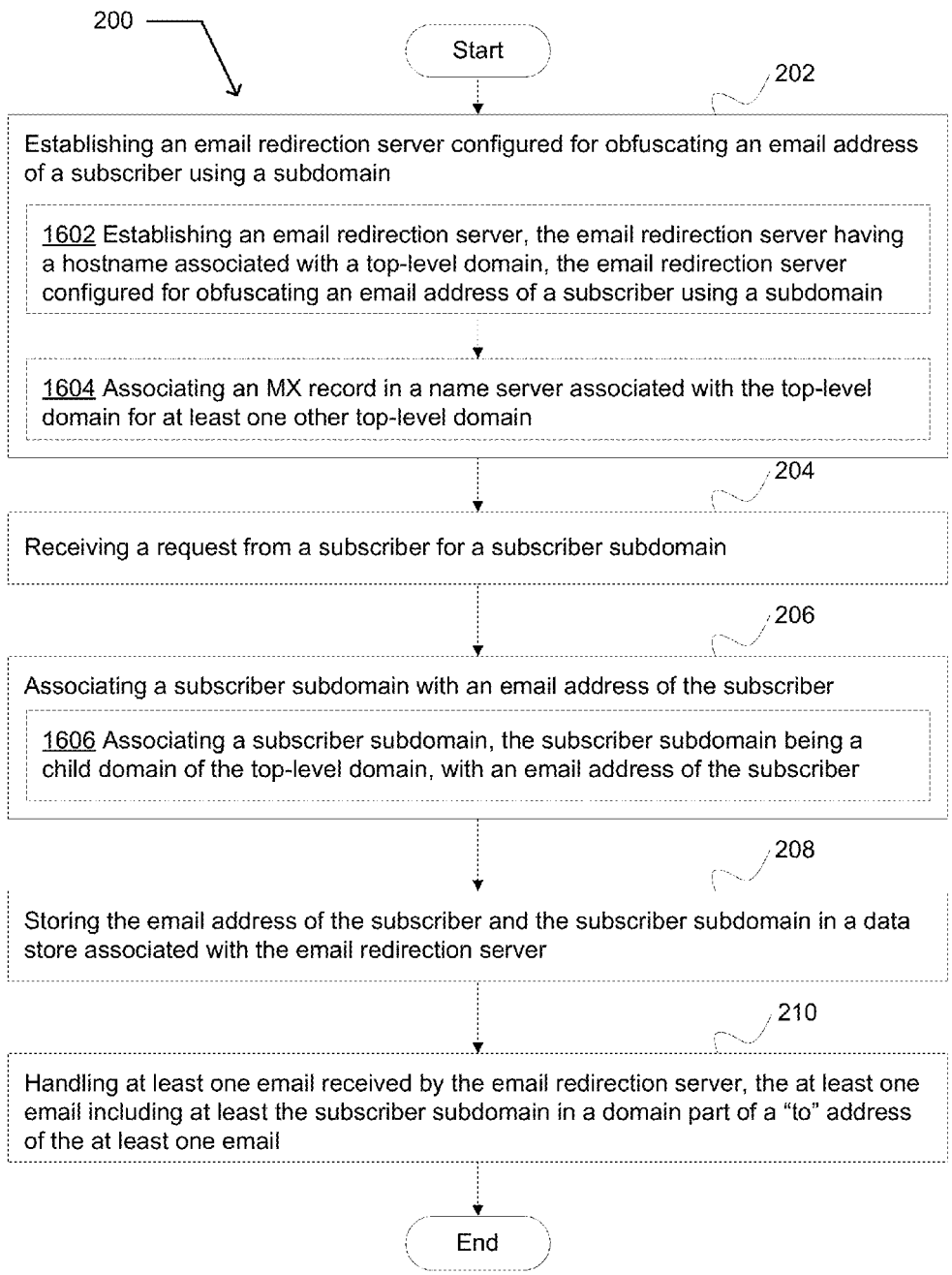

SYSTEMS AND METHODS FOR EMAIL TRACKING AND EMAIL SPAM REDUCTION USING DYNAMIC EMAIL ADDRESSING SCHEMES

PRIORITY CLAIM

This application claims priority from provisional application No. 61/699,352 filed Sep. 11, 2012. The foregoing application is hereby incorporated by reference in its entirety as if fully set forth herein.

FIELD OF THE INVENTION

This invention relates generally to electronic mail, and more specifically, to systems and methods for email tracking and email spam reduction using dynamic email addressing schemes.

BACKGROUND

Electronic mail systems provide users of these systems with the ability to exchange messages electronically. Further opportunities exist for incorporating dynamic email addressing schemes to provide additional benefits to users of electronic mail systems.

SUMMARY

Method and system embodiments involving implementation of email tracking and email spam reduction using dynamic email addressing schemes as disclosed herein may take different forms. For example, one or more computer program products having non-transitory computer readable media for encoding process instructions may be incorporated in a computerized system.

An exemplary system and/or method for email tracking and email spam reduction using dynamic email addressing schemes may include establishing an email redirection server configured for obfuscating an email address of a subscriber using a subdomain; receiving a request from a subscriber for a subscriber subdomain; associating a subscriber subdomain with an email address of the subscriber; storing the email address of the subscriber and the subscriber subdomain in a data store associated with the email redirection server; and handling at least one email received by the email redirection server, the at least one email including at least the subscriber subdomain in a domain part of a "to" address of the at least one email. In an exemplary system and/or method embodiment, at least a portion of the foregoing (e.g. at least one of the establishing, receiving, associating, storing or handling) may be at least partially encoded in one or more non-transitory computer-readable media. In a different exemplary system and/or method embodiment, at least a portion of the foregoing may be at least partially implemented in hardware. In a different exemplary system and/or method embodiment, at least a portion of the foregoing may be at least partially implemented in circuitry.

Additional possible system and/or method features may include facilitating delivery of the at least one email at least one of from the subscriber or to the subscriber, the facilitating delivery of email including at least obfuscating the email address of the subscriber. Additional possible system and/or method features may include determining that the at least one email was received from the subscriber, including searching for a record in the data store having the subscriber subdomain in the domain part of the "to" address of the at least one email and matching the email address associated with the record with the "from" address of the at least one email; and determining an envelope for facilitating delivery of the at least one email including obfuscating the email address of the subscriber.

Additional possible system and/or method features may include determining an address for delivery of the at least one email in a local part of the "to" address of the at least one email; obfuscating the email address of the subscriber; and facilitating delivery of the at least one email. Additional possible system and/or method features may include searching for a record in the data store having the address for delivery of the at least one email in the local part of the "to" address of the at least one email; and responsive to the search, determining an address for the "from" field of the envelope, including: determining a new address for the "from" field of the envelope if the search finds no result; and choosing an address for the "from" field of the envelope from the email address associated with the search result if the search finds a result.

Additional possible system and/or method features may include determining an envelope for facilitating delivery of the at least one email including obfuscating the email address of the subscriber; facilitating at least one tracking function associated with the at least one email; and facilitating delivery of the at least one email. Additional possible system and/or method features may include determining that the at least one email is intended for the subscriber, including: searching for a record in the data store having the subscriber subdomain in the domain part of the "to" address of the at least one email; and determining that the email address associated with the record is different from the "from" address of the at least one email; and handling the at least one email.

Additional possible system and/or method features may include determining an envelope for facilitating delivery of the at least one email including addressing the at least one email to the email address associated with the subscriber, including: addressing the at least one email to the email address associated with the record; and setting the "from" address of the envelope to the email address of the sender of the at least one email received by the email redirection server; and facilitating delivery of the at least one email. Additional possible system and/or method features may include determining a "reply-to" address of the envelope, including: appending the subdomain associated with the subscriber to the "from" address of the at least one email received by the email redirection server; and associating the "from" address and appended subdomain with the "reply-to" address of the envelope.

Additional possible system and/or method features may include authenticating the at least one email using at least one security rule; and responsive to the authenticating the at least one email using at least one security rule, at least one of forwarding the at least one email to the subscriber or determining a disposition of the at least one email. Additional possible system and/or method features may include verifying the at least one email was received within at least one time period associated with at least one temporary email address. Additional possible system and/or method features may include verifying the at least one email has a "to" address which passes at least one address-hash rule associated with at least one temporary email address.

Additional possible system and/or method features may include at least one of disposing of the at least one email, placing the at least one email in a spam folder or forwarding the at least one email to an alternate email address associated with the subscriber. Additional possible system and/or method features may include determining whether the at least one email received by the email redirection server is associated with a subscriber, including determining that the at least one email received by the email redirection server is at least one of from the subscriber or to the subscriber; and responsive to the determining whether the at least one email received by the email redirection server is associated with a subscriber, at least one of: handling the at least one email received by the email redirection server if the at least one email received by the email redirection server is associated with a subscriber; or notifying the sender of the at least one email received by the email redirection server that the sender is not a subscriber. Additional possible system and/or method features may include designating the sender of the at least one email received by the email redirection server as another subscriber; associating another subscriber subdomain with an email address of the another subscriber; and storing the email address of the another subscriber and the another subscriber subdomain in the data store associated with the email redirection server.

Additional possible system and/or method features may include establishing an email redirection server, the email redirection server having a hostname associated with a top-level domain, the email redirection server configured for obfuscating an email address of a subscriber using a subdomain. Additional possible system and/or method features may include associating a subscriber subdomain, the subscriber subdomain being a child domain of the top-level domain, with an email address of the subscriber. Additional possible system and/or method features may include associating an MX record in a name server associated with the top-level domain for at least one other top-level domain.

In addition to the foregoing, various other methods, systems and/or program product embodiments are set forth and described in the teachings such as the text (e.g., claims, drawings and/or the detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, embodiments, features and advantages of the device and/or processes and/or other subject matter described herein will become apparent in the teachings set forth herein.

BRIEF DESCRIPTION OF THE DRAWINGS

Certain embodiments of the present invention are described in detail below with reference to the following drawings:

FIGS. 1a, 1b 1c, 1d and 1e depict exemplary environments in which the methods and systems described herein may be represented;

FIG. 1f depicts a flow of an email message in an exemplary process and environment through which the methods and systems described herein may be represented;

FIG. 2 depicts a high-level logic flowchart of an operational process;

FIG. 3 depicts an alternative implementation of the operational process of FIG. 2;

FIG. 16 depicts an alternative implementation of the operational process of FIG. 2.

DETAILED DESCRIPTION

Figure 1A:
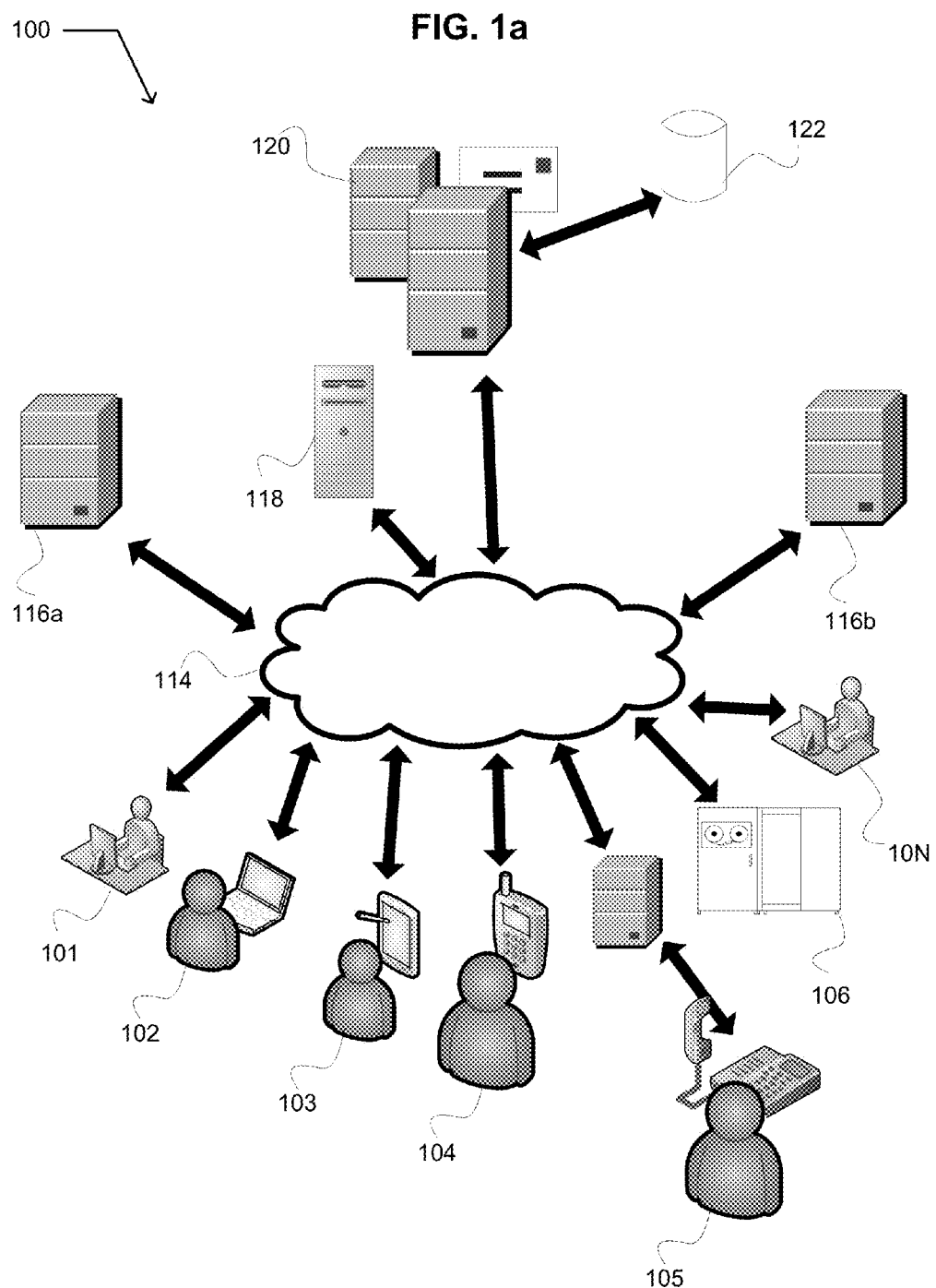

This invention relates generally to electronic mail, and more specifically, to systems and methods for email tracking and email spam reduction using dynamic email addressing schemes. Specific details of certain embodiments of the invention are set forth in the following description and in FIGS. 1-16 to provide a thorough understanding of such embodiments. The present invention may have additional embodiments, may be practiced without one or more of the details described for any particular described embodiment, or may have any detail described for one particular embodiment practiced with any other detail described for another embodiment.

Importantly, a grouping of inventive aspects in any particular "embodiment" within this detailed description, and/or a grouping of limitations in the claims presented herein, is not intended to be a limiting disclosure of those particular aspects and/or limitations to that particular embodiment and/or claim. The inventive entity presenting this disclosure fully intends that any disclosed aspect of any embodiment in the detailed description and/or any claim limitation ever presented relative to the instant disclosure and/or any continuing application claiming priority from the instant application (e.g. continuation, continuation-in-part, and/or divisional applications) may be practiced with any other disclosed aspect of any embodiment in the detailed description and/or any claim limitation. Claimed combinations which draw from different embodiments and/or originally-presented claims are fully within the possession of the inventive entity at the time the instant disclosure is being filed. Any future claim comprising any combination of limitations, each such limitation being herein disclosed and therefore having support in the original claims or in the specification as originally filed (or that of any continuing application claiming priority from the instant application), is possessed by the inventive entity at present irrespective of whether such combination is described in the instant specification because all such combinations are viewed by the inventive entity as currently operable without undue experimentation given the disclosure herein and therefore that any such future claim would not represent new matter.

FIGS. 1a to 1e depict an exemplary environments 100 in which the methods and systems described herein may be represented. In the exemplary environment 100, one or more email users 101, 102, 103, 104, 105, 106 and 10N are depicted. The email users 100 ... 10N may exchange email with other email users 100 ... 10N via one or more email systems 116a and/or 116b. An email redirection server 120 is further depicted. Any or all of the one or more email users may be subscribers of the email redirection server.

An email system 116a, 116b and/or the email redirection server 120 may be an entity implementing the Simple Mail Transfer Protocol (SMTP) service as described under IETF RFC 821, "Simple Mail Transfer Protocol" and/or RFC 2821, wherein email messages conforming to IETF RFC 822, "Standard for the Format of ARPA Internet Text Messages" and/or IETF RFC 2822 may be sent or received. Importantly, the concepts within the instant disclosure are applicable to email systems implemented using non-SMTP mail protocols such as UUCP mail per IETF RFC 976 or FTP mail; email systems with extensions to SMTP; email systems using any past or future version of SMTP; and/or email systems in which SMTP is at least partially implemented, all of the foregoing being non-limiting examples. In some embodiments the email redirection server may be implemented in an environment in which SMTP is used for transport of mail in between separate servers, but another protocol which may or may not resemble SMTP is used to send email between a client and a server, including Post Office Protocol (POP), Internet Message Access Protocol (IMAP), Microsoft Exchange, Lotus Notes/Domino, etc. Alternatively, the invention disclosed herein may be used to implement redirection of SMS messages wherein the subscriber's phone number is obfuscated when sending and/or receiving SMS messages. Other envisioned environments include ESMTP, MIME, LMTP, Sender Policy Framework (SPF), instant messaging, XMPP, DomainKeys, Postfix, De-Mail, open source Message Transfer Agents (MTA) and/or SMTPi among others.

Within the instant disclosure, a particular SMTP field may be disclosed and/or included in a claim such as a "from" or "to" field within an SMTP message header defined according to RFC 822. However, other mail protocols have similar fields and the mapping of the invention as described herein from an SMTP solution to a different mail protocol, which may involve remapping the field names from SMTP to the other protocol alone or in conjunction with other implementation aspects, is an expected embodiment. For example, implementation of the systems and/or methods herein on a UUCP mail system could be achieved by expressing email addresses in the UUCP mail form "domain!user" instead of the SMTP form "localpart@domainpart" and making other appropriate changes as needed. Accordingly, a reference herein or a claim limitation referring to the "domain part of a 'to' address of the at least one email" which appears to relate SMTP terminology should be understood to be equally applicable to UUCP mail or other email protocols, as in the "'UUCP site name' of the bang path of the at least one email" for example. Therefore, while the instant disclosure utilizes SMTP as an exemplary model on which to implement the email redirection server systems and methods, implementations within other email frameworks are clearly envisioned and all such implementations irrespective of the particular email protocol whether past, present or future are within the scope of this disclosure and/or claims. SMTP is given as a non-limiting example of an exemplary environment only.

Additionally, while RFC 822 message header fields are provided as the exemplary field names in the instant disclosure, it is intended by the inventive entity that the invention may be implemented on any email system whether or not connected to the Internet. Applicant does not intended to be limited by the name of RFC 822 "Standard for the Format of ARPA Internet Text Messages" and intends that the email redirection server may be used in an environment which is connected to the Internet, or an environment which at least partially includes the Internet, or an environment which is an Intranet (i.e. in which all servers are on a private network in which no node connects to the public Internet), or any environment 114 using any coupling of nodes, routers, switches, hubs, bridges, gateways, modems, firewalls, protocol, DNS server 118, wired network, and/or wireless network, irrespective of whether such a connection implicates the term "Internet." Indeed, it is conceivable that the email redirection server may be implemented in a software-only environment on a single node in which two email users (or one email user emailing to himself or herself using two different accounts) utilize an email client configured on a single node on which the email server module(s) and email redirection server also reside (see, e.g., FIG. 1e). Any environment within the scope of this disclosure, including but not limited to such a software-only environment, may or may not include virtual machines, terminal sessions, windows, login sessions, time slices, services, or multitasking environments, or the foregoing software embodiments may be utilized in conjunction with firmware or hardware configurations in which an email redirection server is implemented. Additionally, a user interface may be implemented at a device local to a user, remote from the user or may be a part of the device housing the email server and/or email redirection server, or email mail be sent without a user interface at all as will be explained below.

In addition, an email redirection server 120 may be implemented and utilized by clients in any environment in any combination of software, firmware, hardware, connection, coupling or networking 114. A client system may be implemented in software and/or firmware on any adequate desktop 101, laptop 102, notebook, pentop, slate, tablet 103, cellular phone, smartphone 104, PDA, mobile device, two-way pager, voice-response system 105 (in which a user dictates email or in which email is audibly read to a user either via headset or over the telephone, which may be implemented using any of the software, firmware and/or hardware described herein), or via client implementations of the client software in other consumer devices and/or appliances such as a television, a game console, a refrigerator, an automobile, and/or an airplane, or any other device capable of enabling a user to send or receive email 10N.

Further, use of the term "user" is meant in a non-limiting sense such that a user may be a human, but a user may also be, for example, a software module which communicates using email. The user may include a person, an entity, and/or a government. Although a user may be shown herein as a single illustrated Figure, and/or be described in the singular, the term user may be representative of one or more human user(s), robotic user(s) (e.g., computational entity), and/or substantially any combination thereof (e.g., a user may be assisted by one or more robotic agents). Further, the user, as set forth herein, even if shown as a single entity, may in fact be composed of two or more entities. In general, the same may be said of "sender" and/or other entity-oriented terms as such terms may be used herein. For example, an email "user" and/or "sender" may be a software service 106 that is programmed to send email alerts to a human user, or to another software service or other entity, upon detecting a particular condition. Or, a "user" and/or "sender" may be an airline sending a notification of a flight status update to a traveler, or may be an inventory system for a retailer with a location low in stock automatically emailing an order for replenishment to a supplier. At the destination, a recipient "user" may be a software service that opens the email containing the order for replenishment and automatically generates a pick-list for warehouse personnel to fulfill the order, where the actual email is unseen by a human. The "user" may be a software service implemented by a government agency which sends automated email containing sensitive automatically-generated data to local police forces, where the actual identity of the government agency is a secret but the data is deemed to be useful by the police. Consequently, a "user" which may subscribe and/or send mail to or from the email redirection service is not limited to a human, but may include a software service or any other entity operable to send and/or receive email via a particular email account coupled with an email server. Accordingly, a "user interface" for a user sending email is not required inasmuch as the email redirection server does not operate strictly on messages from actual human users.

FIGS. 1a to 1e also depict email systems 116a and 116b, a DNS server 118 and the email redirection server 120 as, variously, one or two physical computing devices. In fact, any of the email systems, DNS servers or email redirection servers are capable of, and likely to be, running in some form of redundant and/or distributed environment involving more than a single piece of server hardware. Importantly, the instant disclosure of email servers, DNS servers and email redirection servers relates these servers logically, with a completely agnostic view to the actual physical and/or redundant and/or distributed connected environment. Thus, any of the email systems, DNS servers, email redirection servers or even client systems may be established on or in any of a single PC, a server system, a server cluster, a load-balanced configuration, a server farm, bastion hosts, proxy servers, email forwarders, virtual servers, a geographically dispersed configuration, a disaster recovery site, or any other appropriate physical and/or logical arrangement or coupling capable of hosting logical email clients, servers, DNS and the email redirection server disclosed herein. FIGS. 1a to 1e depict various such configurations, but the instant disclosure is not limited by the configurations depicted in FIGS. 1a to 1e and notes that other configurations of software, firmware and/or hardware modules supporting the email redirection server will become apparent and likely in light of the teachings herein.

FIG. 1a depicts an exemplary environment 100 in which the methods and systems described herein may be represented. FIG. 1a depicts a cloud 114 to which the varied devices supporting at least a portion of the email redirection server and its users are connected. Cloud 114 is meant to depict connections, logical or physical, between users or user devices 100 . . . 100N, email systems 116a and 116b, DNS 118 and the email redirection server 120 (with its local or remote data store 122). The cloud may represent any combination of physical networking hardware, Internet connections, private network connections, virtual sessions, client sessions, or any means of establishing a communications link between any of the user devices, email servers, DNS and the email redirection server.

Figure 1B:
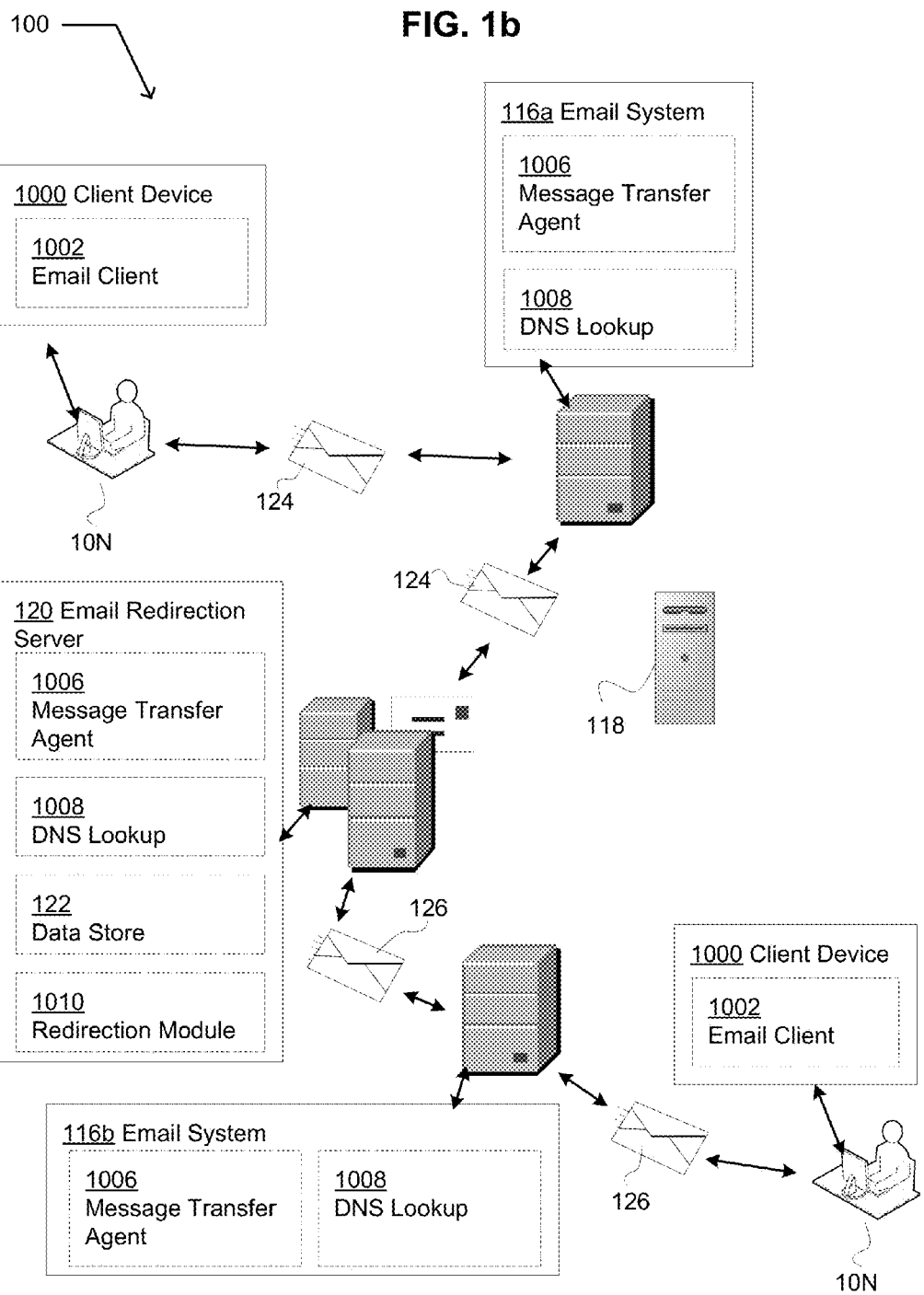

FIG. 1b depicts an alternate exemplary environment in which the methods and systems described herein may be represented. In FIGS. 1b to 1e, a cloud is not shown in light of the foregoing disclosure that the email redirection server is completely agnostic as to the hardware and networking selections. FIG. 1b depicts a first user 10N operating a first client device 1000, the client device containing an email client 1002. As previously disclosed relative to FIG. 1a, a first user 10N may be using a desktop, laptop, tablet, smartphone, voice-response system etc, and in fact the first user does not even have to be a human user. The email client resident on the client device is implemented at least partially in one or more of software, firmware, or hardware. User 10N uses email client 1002 to compose an email 124 on the client device 1000. The email goes from the client device to a first email system 116a, which includes a Message Transfer Agent 1006 and a DNS Lookup module 1008. The DNS Lookup module is operable to communicate with the DNS infrastructure 118 to determine a destination mail server for the email 124. Upon determining a destination mail server, email 124 is forwarded by the Message Transfer Agent.

If the first user 10N has addressed the email 124 appropriately (in a manner which will be discussed below relative to FIGS. 2 to 18), the email 124 will be received by the email redirection server 120. The email redirection server 120 also includes a Message Transfer Agent 1006 and a DNS Lookup module 1008, as well as a data store 122 and a redirection module 1010. In some embodiments, the Message Transfer Agent 1006 and the redirection module 1010 are combined into a single module. In other embodiments, the Message Transfer Agent is separate from the email redirection module. Using methods disclosed elsewhere herein, the email redirection module, may, for example, readdress the email 124 and forward it as email 126 with a new destination email address. The email redirection module may search the contents of its data store 122 to determine, for example, whether the email 124 was received from a subscriber, and may utilize the DNS Lookup module to determine how to forward the email 126 based on the new destination address.

Email 126 may be received by a second email system 116b, which may be the email system on which the email account for the second user 10N is hosted. The second email system 116b is also provisioned with a Message Transfer Agent 1006 and a DNS Lookup module 1008. When the second user 10N uses a second client device 1000 including email client 1002 to access his or her mailbox on the second email system 116b, the second user will receive message 126. The flow may, of course, be reversed, such that the second user 10N is the sender of mail message 126, passing through the second email system 116b, the email redirection server 120 (which readdresses the message as email 124), and the first email system 116a. The first user 10N may be the recipient, so that when the first user checks his or her email, message 124 will be received. Alternatively, the first user 10N may send an email to himself or herself, which, if addressed appropriately, would pass through email redirection server 120 and be able to be received by the first user 10N using a different email account.

Figure 1D:
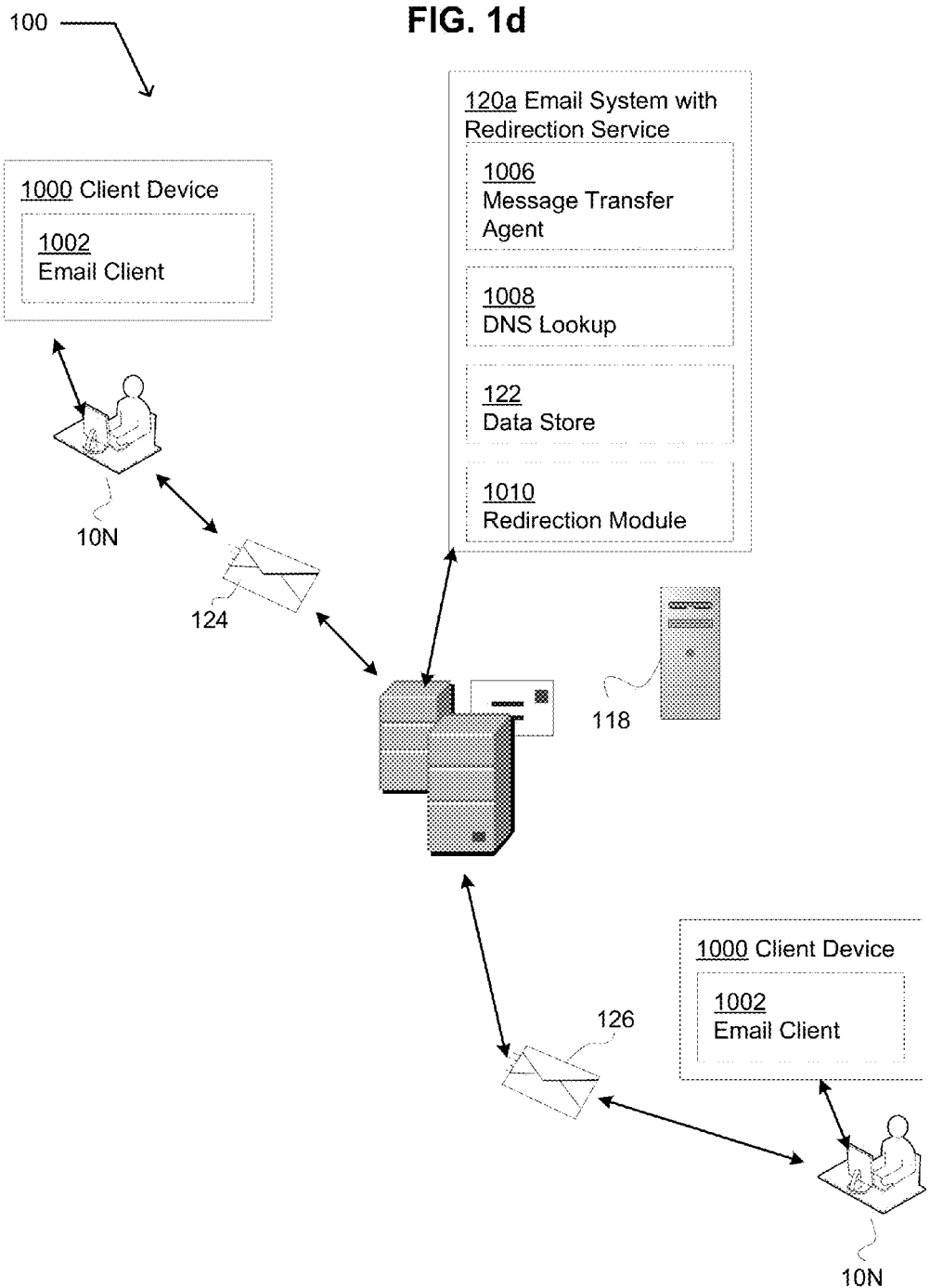
Figure 1E:
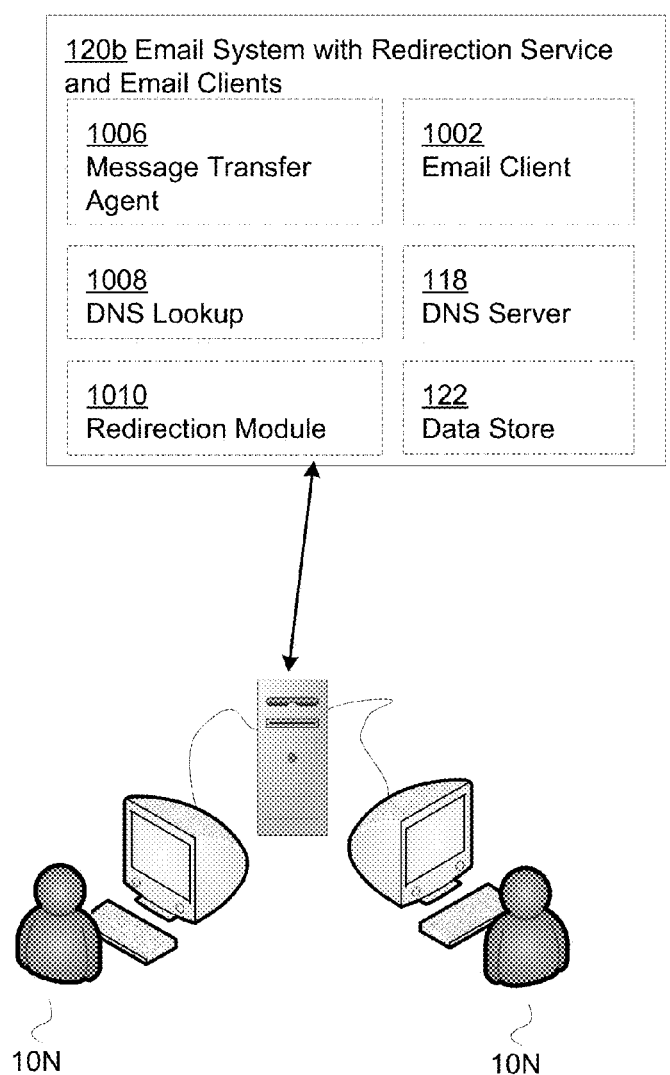

FIGS. 1c to 1e depict other alternate exemplary environments in which the methods and systems described herein may be represented. Particularly, what FIGS. 1c to 1e demonstrate is that the email redirection server 120 may be combined with an email system 116. The two may be operated by the same entity, in the same logical environment or even on the same physical hardware.

FIG. 1c, for example, depicts an email redirection service which has been deployed within the same email system utilized by the second user 10N, the aggregation of the redirection service and email system forming email system with redirection service 120a. When the first user 10N addresses the email appropriately, email 124 goes to the first email system 116a, which consults the DNS infrastructure 118 to determine the destination email system and forwards email 124 to email system with redirection service 120a. The email system with the redirection service integrated notes that the intended recipient has an email account resident on that server. It readdresses the message and simply puts it in the mailbox for the recipient second user 10N, rather than forwarding it to a different mail system. When the second user 10N next connects to his or her email box, the readdressed message 126 is available. Of course, the flow may be reversed, such that the second email user 10N who has a mailbox on the email system with redirection service 120 may compose an email 126 which is intended to be redirected. Upon reaching the mailbox on system 120a, the redirection module readdresses the email and forwards it as email 124 to the first email system 116a, where it awaits the first user 10N.

FIG. 1d, for example, depicts an email system with redirection service 120a that happens to be the email provider for both the first user 10N and the second user 10N. For example, if first user 10N and second user 10N were both subscribers to a free email service named "happymail.com" and the entity operating "happymail.com" decided to provide email redirection as a free service to its subscribers, then an email could be redirected and delivered without ever leaving the email system with redirection service 120a. A first user 10N who was a subscriber to the "happymail.com" service would use a first client device 1000 with email client 1002 to send email intended to be received by the second user 10N who is also a subscriber to the "happymail.com" service. The email 124 would go to the email system with redirection service 120a operated by happymail.com. If the email 124 was addressed appropriately, as will be disclosed elsewhere herein, the redirection module 1010 would readdress the message and place it in the mailbox for the second user 10N, which also resides on the "happymail.com" email system. Then, when the second user 10N checks his or her email, email message 126, having been readdressed by the redirection module 1010, would be available. As previously discussed, the email system with redirection service, while depicted in FIG. 1d as a single logical unit, may in fact be implemented across one or more physical systems in any configuration of load-balancing, clustering, failover hardware or other distributed systems whether in a single data center or spread across geographically disparate locations.

FIG. 1e, for example, depicts an email redirection service which has been deployed in a singular environment, including email clients. Users 10N connect with the email system with redirection service and email clients 120b to send one another email using flows disclosed previously. The email system with redirection service and email clients 120b is depicted as a single server with dumb terminals to further highlight that the email redirection service may be scalably implemented in environments as disparate as a single PC solution or a globally-distributed solution with clients, email servers, redirection services, and DNS infrastructure spread across multiple sites using any combination of physical and logical couplings.

FIG. 1f depicts a flow of an email message in an exemplary process and environment through which the methods and systems described herein may be represented. Joe Smith, a user 10N utilizing a device to send email, is preparing to send email to "deal@dealoftheday.com". Joe's desired destination email address is a mailbox called "deal" at an email domain named dealoftheday.com, the mailbox residing on the email system 116b for dealoftheday.com. Joe is a subscriber of the Gmail email service, with a mailbox on email system 116a. In this example, Joe does not wish his own email address, "jsmith@gmail.com", to be revealed to dealoftheday.com. Joe is a subscriber of the email redirection server 120.

Via the email redirection server, Joe may mail the email message 124 to "deal@jsmith.tx" rather than to "deal@dealoftheday.com". The mail message will have a "from" address of Joe's native email address, "jsmith@gmail.com".

Upon sending the message, the Gmail service on email system 116a will perform a DNS lookup to find the appropriate destination for email to the jsmith.tx domain. The DNS lookup may include a search at a root DNS server and include further iterative DNS requests until the MX record for the jsmith.tx domain is located. The result of the DNS request from the DNS infrastructure will tell Gmail to send the message to the email redirection server 120 at, for example, redir.mailhost.com. The Gmail server 116a will then send the email message 124 to the email redirection server 120. (Additional DNS lookups for other resource records other than MX records may occur.)

The email redirection server 120, upon receiving email addressed to a recipient in the jsmith.tx subdomain, will determine whether the email is coming from or going to a subscriber of the email redirection server. The email redirection server may search a data store 122 to assist in the determination, for example, in a table named "Subscribers". In this instance, the database lookup finds the contents of the "from" address, "jsmith@gmail.com", in the Subscribers table and determines the email 124 is coming from subscriber Joe Smith. The email redirection server may then search the data store to determine whether the ultimate destination is a mailbox to/from which Joe Smith has sent/received email, for example, in a table named CodedAddressee that is specific to Joe Smith. Here, the "to" address of email 124 is "deal@jsmith.tx" which the email redirection server converts to "deal@dealofthedeal.com" and prepares a new email.

The foregoing description of the flow depicted in FIG. 1f shows one example of an operational process which may be performed by the email redirection server 120. Other embodiments disclosed herein will show the email redirection server performing functions in addition to readdressing an outgoing email. Any literal names or other implementation details in the foregoing example other than those expressed in the claims are exemplary only. Server names such as "gmail.com" or "redir.mailhost.com" or database table names such as "subscribers" or "Addressees" or any column names are provided strictly to aid in understanding the exemplary flow, and such names should not be viewed as limiting the scope of the invention in any way.

FIG. 2 depicts a high-level logic flowchart of an operational process, according to an embodiment of the invention. An operational flow 200 may be implemented as a redirection module 1010 and may be associated with an email redirection server 120 according to exemplary environments described elsewhere herein with reference to FIGS. 1a to 1e. The operational flow may include an operation 202, an operation 204, an operation 206, an operation 208 and an operation 210.

At 202, an operation may establish an email redirection server configured for obfuscating an email address of a subscriber using a subdomain. The email redirection server 120 is established to work in conjunction with or as a component of an email system 116 as described elsewhere herein, and may be any combination of software, firmware or hardware suited for establishing such a server. In some embodiments, an email redirection server may be configured to be utilized by subscribers, which may be any of users 101.10N. The email redirection server may be configured to obfuscate an email address of a subscriber. The email redirection server may be configured to associate a subscriber with a particular subdomain.

At 204, an operation may receive a request from a subscriber for a subscriber subdomain. For example, an individual named Joe Smith, whose native email address is jsmith@gmail.com (the true, or real, email address of Joe Smith, which Joe may wish to have obfuscated) and who may be any of users (or utilizing devices) 101.10N, may wish to become a subscriber of the email redirection server 120 and request an individualized subscriber subdomain. In some embodiments, the individual may forward the request to the email redirection server via an email request. In different embodiments, the request may be entered via a webform. In other embodiments, the request may be made verbally to an operator or interactive voice response service associated with the email redirection service. In still other embodiments, the request may be ad hoc, as in a systems administrator of the email redirection service entering the configuration data by hand for a testing subscription. In further embodiments, the request may be received by the email redirection service in any manner in which the subscriber's native email address, among other demographic information, is received.

A subscriber denotes an entity recognized by the email redirection server as authorized to utilize the services of the email redirection server. In some embodiments, a subscriber gives value to the operator of the email redirection server (e.g. pays a monetary fee on a per-email or per-time period or some other fee basis, or otherwise provides consideration such as is an employee of the operator). In different embodiments, a subscriber does not give value to the operator of the email redirection server, but the consideration is provided by a different entity, such as an operator of an email system containing the subscriber's mailbox, or another third-party. In other embodiments, no consideration is received by the operator of the email redirection server on behalf of the subscriber, and the term "subscriber" merely denotes a user of the email redirection server that is already known to the email redirection server with services provisioned for that subscriber. In still other embodiments, a subscriber is a user 100 . . . 10N who has never utilized the email redirection server previously, but who sends an email addressed so that it is received at the email redirection server with the user intending for the email redirection server to provision a subdomain for the user.

At 206, an operation may associate a subscriber subdomain with an email address of the subscriber. For example, the email redirection server upon receiving the request from Joe Smith (jsmith@gmail.com) may assign a subdomain of "jsmith.tx" to Joe Smith. In some embodiments, the subdomain is a child domain of a top-level domain. In the instant example of jsmith.tx, the top-level domain (TLD) is the 'tx' domain, and its child domain 'jsmith' completes the subdomain jsmith.tx assigned to Joe Smith. Associating a subscriber subdomain may include creating an MX record in the DNS infrastructure for the subdomain. For example, creating an MX record in the DNS namespace for jsmith.tx, such that email addressed to any address having "jsmith.tx" in the domain part of the email address (e.g. "anyrecipient@jsmith.tx") would arrive at the email redirection server for processing. In some embodiments, a subdomain is a child domain of a non-TLD, that is, a subdomain of a domain which is registered in an existing namespace that is not a top-level domain. For example, an email redirection service with an existing DNS namespace at mailhost.com could configure a subdomain domain such as jsmith.mailhost.com for email redirection associated with Joe Smith. Creating an MX record may include adding the MX record to an authoritative DNS server for the subdomain and permitting the change to be visible throughout the global DNS infrastructure. Other aspects of correctly associating a new MX record in the DNS namespace are beyond the scope of this disclosure but are widely understood.

At 208, an operation may store the email address of the subscriber and the subscriber subdomain in a data store associated with the email redirection server. For example, the email redirection server 120 may add a record in the data store 122 containing "jsmith.tx" and "jsmith@gmail.com" to reflect that "jsmith@gmail.com" is the true address associated with the jsmith.tx subdomain, which is intended to be obfuscated or for which other email redirection server services will be performed.

At 210, an operation may handle at least one email received by the email redirection server, the at least one email including at least the subscriber subdomain in a domain part of a "to" address of the at least one email. For example, in some embodiments, the email redirection server may receive an email addressed to "deal@jsmith.tx" and redirect the message to a different addressee such as "deal@dealoftheday.com" on behalf of subscriber Joe Smith, using methods depicted in FIG. 1*f* and/or disclosed elsewhere herein. In different embodiments, the email redirection server may receive an email intended for a subscriber addressed only with a coded (proxy) address of the subscriber and forward it to the subscriber's native email address. In other embodiments, the email redirection server may respond to an email from a new user that wishes to become a subscriber and permit the new user to request a subscriber account by email. In still other embodiments, the email redirection server may facilitate a tracking function for the email on behalf of the subscriber. In yet another embodiment, the email redirection server may apply security rules to an incoming email. In different embodiments, the email redirection server facilitates other redirection services for subscribers and/or non-subscribers.

FIG. 3 depicts an alternative implementation of the operational process of FIG. 2. In some embodiments, operation 210 may include at least one optional operation 212. At 212, an operation may facilitate delivery of the at least one email at least one of from the subscriber or to the subscriber, the facilitating delivery of email including at least obfuscating the email address of the subscriber. In some embodiments, the email redirection server 120 receives a message from a subscriber and readdresses it before sending it to the subscriber's intended recipient. In other embodiments, the email redirection server 120 receives a message intended for the subscriber and readdresses it before sending it to the subscriber's own mailbox. The readdressing may include replacing any of the address fields in the email, including the "to", "from", "reply-to", "cc", "bcc" or any other address field. Particularly, the subscriber may wish to have his or her own native email address obfuscated so that the email is forwarded by the email redirection service with a proxy email address for the subscriber in the "from" field. Further, if the recipient wants to reply to the subscriber, the email will be received by the email redirection server and the subscriber's native email address will be placed in the "to" field before the email is forwarded to the subscriber's email system.

Figure 4:
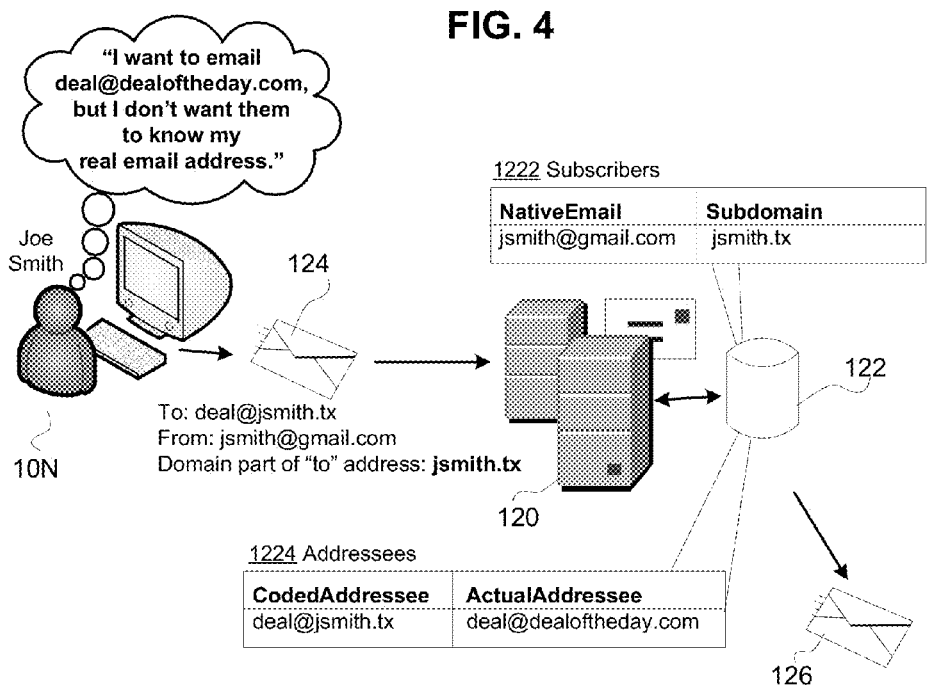
FIG. 4 depicts an alternative exemplary environment in which the methods and systems herein may be represented.

FIG. 4 depicts an alternative exemplary environment in which the methods and systems herein may be represented. Abstracting the example depicted in FIG. 1*f*, exemplary user Joe Smith 10N wants to email "deal@dealoftheday.com" but does not want his true, native email address exposed to the operators of dealoftheday.com. If Joe emails from his Gmail account directly to dealoftheday.com, Joe's true, native email address of "jsmith@gmail.com" will be visible to the operators of dealoftheday.com because it will likely be populated in at least the "from" and "reply-to" fields of Joe's email. Instead, Joe will address his email to be received by the email redirection server 120, which will readdress the email and forward it to dealoftheday.com with a proxy address for Joe in the "from" and "reply-to" fields of the email. Accordingly, if Joe receives too much email from dealoftheday.com, or otherwise wants to cut off communications with them, Joe can arrange for any email addressed to the proxy address to be marked as spam, for example. Joe therefore addresses his email 124 not to "deal@dealoftheday.com" but instead to "deal@jsmith.tx". "jsmith.tx" (the domain part of the "to" address) will enable the email 124 to go to the email redirection server 120 before being forwarded to dealoftheday.com. "deal" (the local part of the "to" address) is Joe's designation that he wants the message ultimately to be delivered to "deal@dealoftheday.com" in the form of message 126 having a new message envelope that has been readdressed by the email redirection server. The email redirection server 120, in handling the email 124, may consult its data store 122 to determine the appropriate handling. For example, it may have a subscriber list in a table 1222 called "Subscribers" and it may have an addressee list in a table 1224 called "Addressees". Other data structures within the data store are possible and will be apparent in light of the instant disclosure.

Figure 5:
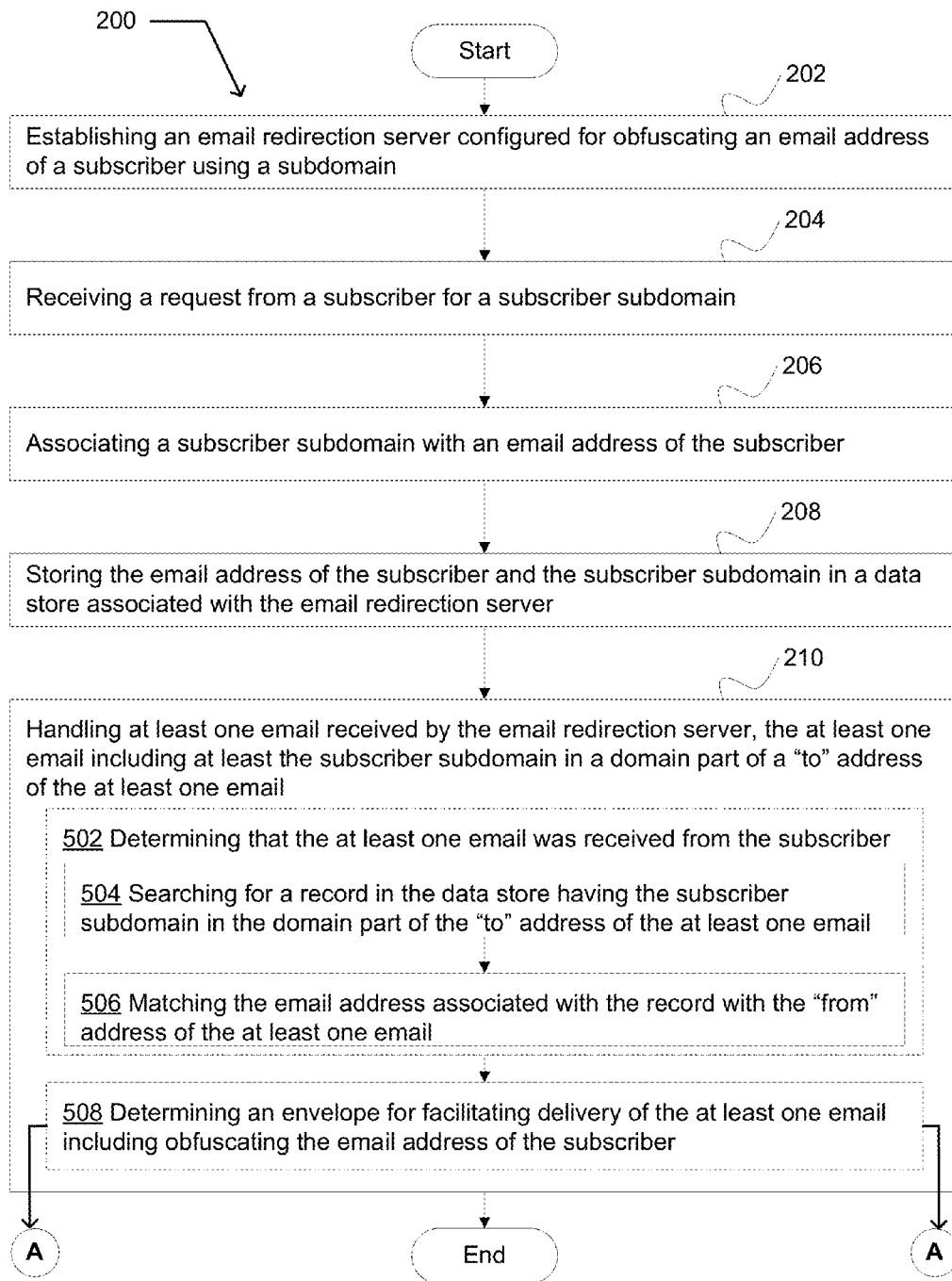
FIG. 5 depicts an alternative implementation of the operational process of FIG. 2.

FIG. 5 depicts an alternative implementation of the operational process of FIG. 2. In some embodiments, operation 210 may optionally include at least operation 502 and operation 508. At 502, an operation may determine that the at least one email was received from the subscriber. Operation 502 may include operations 504 and 506. Determining that the at least one email was received from the subscriber at 502 may include searching for a record in the data store having the subscriber subdomain in the domain part of the "to" address of the at least one email at 504, and matching the email address associated with the record with the "from" address of the at least one email at 506. At 508, an operation may determine an envelope for facilitating delivery of the at least one email including obfuscating the email address of the subscriber.

Utilizing the example depicted in FIG. 4a, upon the email redirection server 120 receiving an email 124, in some embodiments it determines whether the email was received from a subscriber at 502. It may do so by examining the "to" address and particularly, the domain part of the "to" address which in the instant example is jsmith.tx. It may search for a record in the data store having the subscriber subdomain in the domain part of the "to" address at 504. Here, it queries the table "Subscribers" 1222 to see if a record exists where jsmith.tx is in the "Subdomain" column. In the instant example, there is such a record and the corresponding "NativeEmail" column is "jsmith@gmail.com". The process at 506 may match the email address associated with the record with the "from" address of the email. Here, the process matches "jsmith@gmail.com" in the "NativeEmail" column with "jsmith@gmail.com" in the "from" field of the email 124, thus ascertaining that the email has been sent by subscriber Joe Smith.

At 508, the process determines an envelope for facilitating delivery of the at least one email, including obfuscating the email address of the subscriber. Here, Joe's email 124 is given a new envelope including at least new "to" and "from" fields (and perhaps other fields such as "reply-to") so that the email can be forwarded as email 126. Joe's native email address is not present in email 126, obfuscating his true email address.

Figure 6:
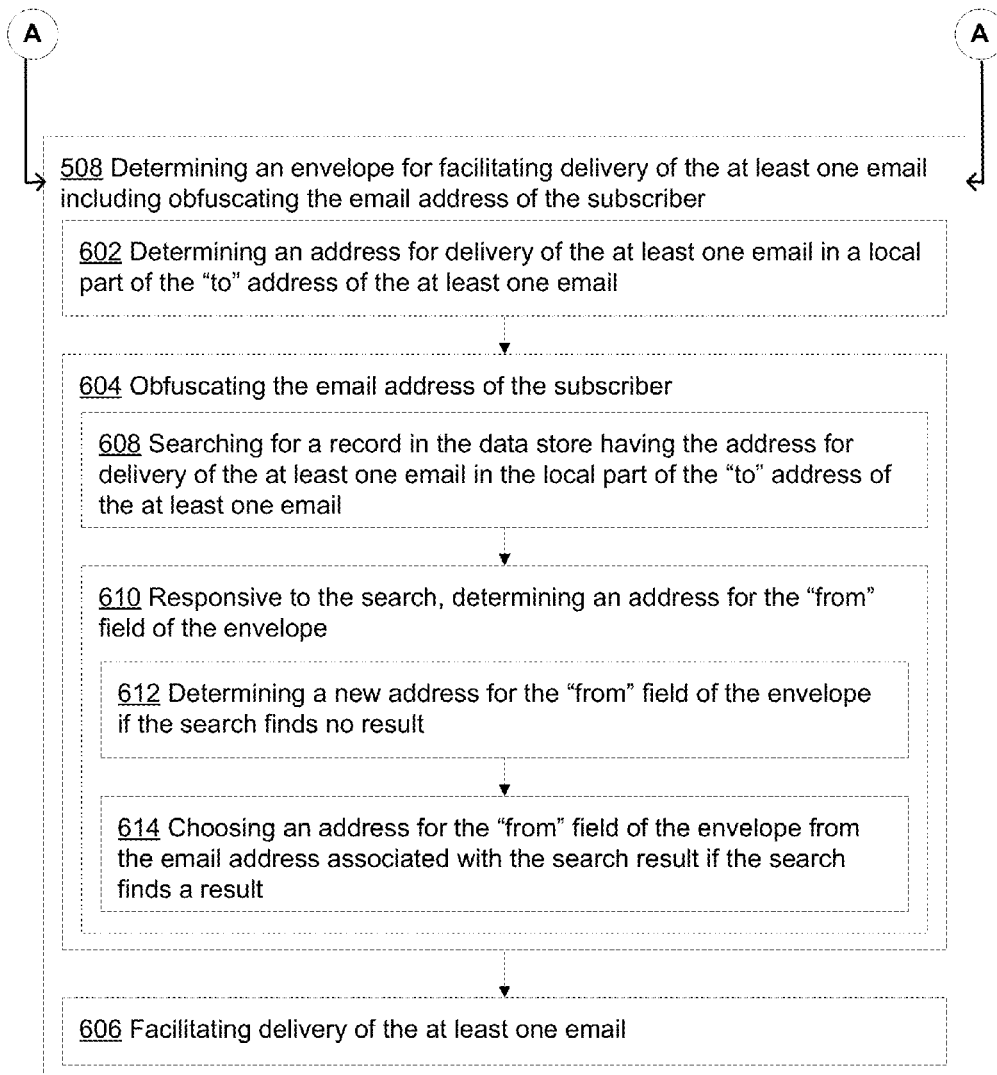
FIG. 6 depicts a continued implementation of the operational process of FIG. 5.

FIG. 6 depicts a continued implementation of the operational process of FIG. 5. In some embodiments, operation 508 may optionally include at least operation 602, operation 604 and operation 606. At 602, an operation may determine an address for delivery of the at least one email in a local part of the "to" address of the at least one email. At 604, an operation may obfuscate the email address of the subscriber. At 606, an option may include facilitating delivery of the at least one email.

Continuing with the example in FIG. 4, in some embodiments the email redirection server 120, upon receiving email 124, will determine an ultimate destination address for the message (i.e. "an address for delivery of the at least one email") by examining the local part of the "to" address of the at least one email 124 and performing a process to either look up an existing destination address, create a new destination address, or use some other method to determine the ultimate destination address for the at least one email. In a further embodiment, the process to look up an existing destination address may include searching a table called "Addressees" 1224 for records associated with Joe Smith, and particularly for records having the domain part of the "to" address "deal@jsmith.tx" in the CodedAddressee field. If it finds such a record, the process may read a corresponding Actual-Addressee column from the record (here, "deal@dealoftheday") and use the contents as the new "to" address for the forwarded message 126.

In different embodiments, the ultimate destination address will be copied directly from the local part of the "to" address to the "to" address of the forwarded message 126 without a lookup taking place. In yet other embodiments, a process may be invoked by the subscriber to add a new coded email address (a "new temp email account") for a prospective email destination. Continuing the example, the email address of the subscriber will be obfuscated (i.e. the forwarded message 126 will not have the subscriber's native email) and then the email redirection server will forward the email to the ultimate destination.

FIG. 6 also depicts a further continued implementation of the operational process FIG. 5. In some embodiments, operation 604 may optionally include at least operation 608 and operation 610. At 608, an operation may search for a record in the data store having the address for delivery of the at least one email in the local part of the "to" address of the at least one email. At 610, an operation may, responsive to the search, determine an address for the "from" field of the envelope, including operations 612 and 614. At 612, an operation may determine a new address for the "from" field of the envelope if the search finds no result. At 614, an operation may choose an address for the "from" field of the envelope from the email address associated with the search result if the search finds a result.

Returning to the example depicted in FIG. 4, in some embodiments, the email redirection server 120, upon determining the address for delivery of the at least one email will obfuscate the native address of the subscriber by examining the data store 122 to see if the subscriber has previously emailed this destination address. For example, if Joe Smith sends email to "deal@jsmith.tx" and the system has previously set up a coded address corresponding to "deal@jsmith.tx", there will be a record in the "Addressees" table 1224 in which the "CodedAddressee" field matches what is in the local part of the "to" address of the email. The system will readdress the outgoing message 126 so that the "to" field comes from the "ActualAddressee" column of the "Addressees" table and the "from" field comes from the "CodedAddressee" field (which is identical to the original "to" field from the local part of the original email 124).

If the system does not find a match in its search of the "Addressees" table 124, indicating the system has not previously handled or been configured for email to this recipient, no record in the "Addressees" table 1224 may be present and the search will find no result. The process may add a record to the Addressees table and determine a new value for the "CodedAddressee" field, which will be the "from" address for the forwarded email 126 and be the address which Joe Smith would use when emailing this recipient in the future.

In some embodiments, Joe Smith may indicate to the email redirection server that he wants the email redirection server to recognize a new recipient by use of a specially formulated "to" part of the at least one email, in which the new recipient's email address is preceded by a predefined character or characters. For example, Joe may address the email to "new-deal@dealoftheday.com". The email redirection server would strip off the prefix "new-" and utilize the remainder of the string for the "ActualAddressee" column of a new record in the "Addressees" table 1224. It could then assign an arbitrary value for the CodedAddressee field (conforming to allowable formats for email addresses), such as "deal@jsmith.tx", which is used as the "from" field for the outgoing email 126, and is how Joe Smith will email this recipient in the future.

Figure 7:
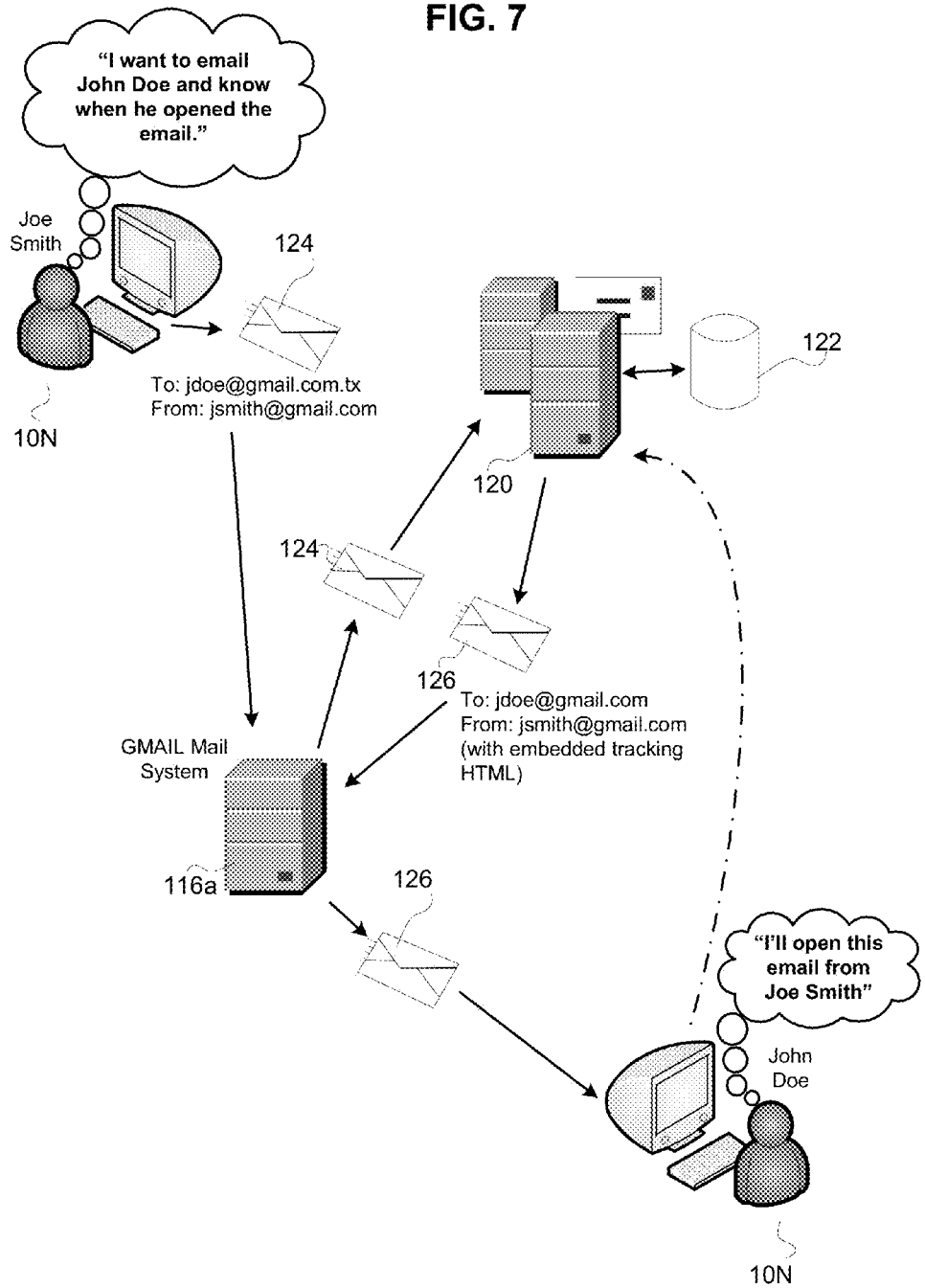
FIG. 7 depicts an alternative exemplary environment in which the methods and systems herein may be represented.

FIG. 7 depicts an alternative exemplary environment in which the methods and systems herein may be represented. In some embodiments, the email redirection server 120 may be used by a first user 10N, such as Joe Smith, for a tracking function associated with an email he sends. Joe Smith may be a user of an email system 116 which has no tracking functionality. By utilizing the email redirection server in addition to his email system, he may have tracking features added to his email. For example, if Joe Smith (jsmith@gmail.com) wishes to email John Doe (jdoe@gmail.com) with tracking functions added by the email redirection server, he may address his outgoing email 124 appending his assigned subdomain (here, ".tx") to the "to" field of the email. In the instant example, rather than emailing to John Doe at "jdoe@gmail.com", Joe would email to "jdoe@gmail.com.tx". The ".tx" suffix, through DNS lookups of MX records and/or other means described elsewhere herein, ensures that Joe's email system 116a would deliver the email 124 to the email redirection server 120.

Upon receiving the email 124, the email redirection server 126 would enable one or more tracking functions, readdress the email to John Doe, and forward it to John as email 126. The one or more tracking functions could be enabled by, for example, adding HTML code to execute upon the email being opened by John Doe. The new message envelope would be determined simply by stripping off the ".tx" suffix, here resulting in a new "to" address of "jdoe@gmail.com". Obfuscating the sender's email address in conjunction with methods described elsewhere herein is an optional step in some embodiments. In the instant example, John Doe is also a user of gmail.com so the email redirection server sends the forwarded email 126 with the new "to" address and embedded tracking codes to the same email system 116a, although as previously disclosed the recipient may use a different email system 116b from that of the sender, and the email 126 would be sent to that email system. Upon John Doe (the second user 10N) opening the email 126, the tracking codes would be activated (represented in FIG. 7 by the broken line between John Doe and the email redirection server). For example, the message may contain an HTML link to the email redirection server 120, and upon the link being activated through John Doe opening the message, the email redirection server may take action. In some embodiments the email redirection server may write the current date and time to the data store 122 along with information associated with the message 126. In different embodiments, the email redirection server may notify the original sender of the email 124 (Joe Smith, here), that the email 126 was opened by the recipient. Other tracking functions might include a length of time the message was viewed; whether the message was forwarded, deleted and/or modified before being forwarded; whether an attachment was viewed, saved, downloaded, modified or deleted; as well as other such tracking functions.

Figure 8:
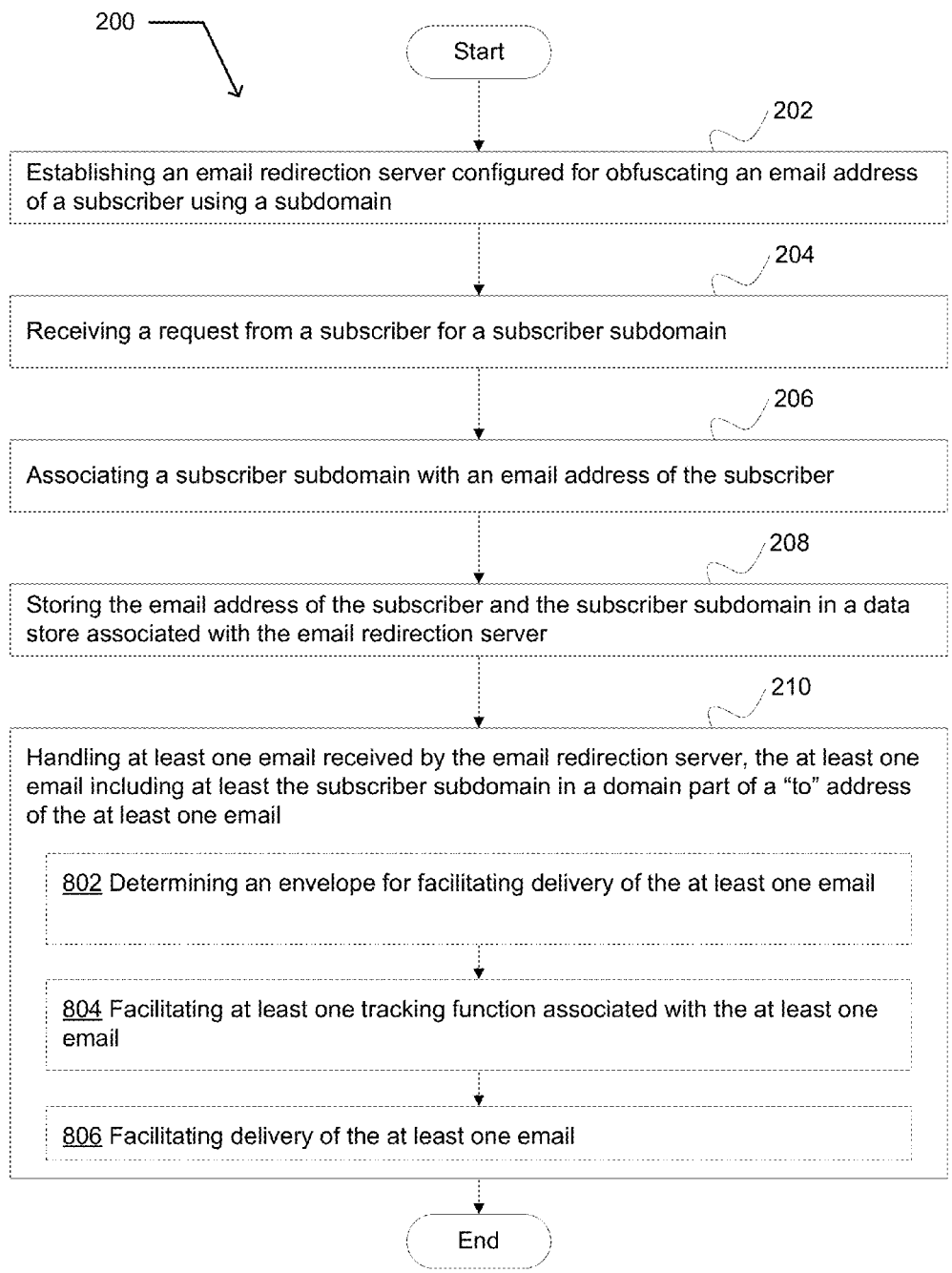
FIG. 8 depicts an alternative implementation of the operational process of FIG. 2.

FIG. 8 depicts an alternative implementation of the operational process of FIG. 2. In some embodiments, operation 210 may optionally include at least operation 802, operation 804 and operation 806. At 802, an operation may determine an envelope for facilitating delivery of the at least one email. At 804, an operation may facilitate at least one tracking function associated with the at least one email. At 806, an operation may facilitate delivery of the at least one email.

Using the example depicted in FIG. 7, in some embodiments, a subscriber 10N of the email redirection server 120 may wish to send an email to a recipient and receive a notification when the recipient has opened the email. If the email system 116 of subscriber 10N has no tracking features available, subscriber 10N may utilize the email redirection server which will add a tracking function to the email. For example, if Joe Smith (jsmith@gmail.com) wishes to email John Doe (jdoe@gmail.com), Joe could address his email 124 differently. Instead of addressing the message to "jdoe@gmail.com", Joe could address it to "jdoe@gmail.com.tx". Email 124 would then be directed to the email redirection server 120 via DNS lookups and/or other implementations disclosed herein.

Upon receipt of the email 124 by the email redirection server 120, the email redirection server would prepare to forward email 124 as email 126 including determining the envelope for facilitating delivery of the email 126 at 802. Determining the envelope might include removing the ".tx" suffix from the "to" address. In some embodiments, the process may obfuscate Joe Smith's native email address using other methods described herein, but in different embodiments the process may leave the "from" address as is. The email redirection server may insert into the email one or more codes, such as one or more HTML codes, to perform a function upon the recipient opening the email, facilitating at least one tracking function associated with the email at 804. The email redirection server would then forward the message 126 having the new envelope and its "to" address of "jdoe@gmail.com" (i.e. facilitating delivery of the email at 806). For example, upon the recipient John Doe opening the email 126, the HTML codes may activate a link on the email redirection server which writes to a tracking database the date and time that the email was opened. Alternatively, or in addition to the foregoing, the email redirection server may email Joe Smith to alert him that the email was opened by John Doe. In this manner, if Joe Smith is a user of an email system without read-receipt or other tracking functionality, Joe can still get such functionality through subscribing to the email redirection server 120 and modifying the "to" address of an email so that it is routed through, and acted upon by, the email redirection server.

Figure 9:
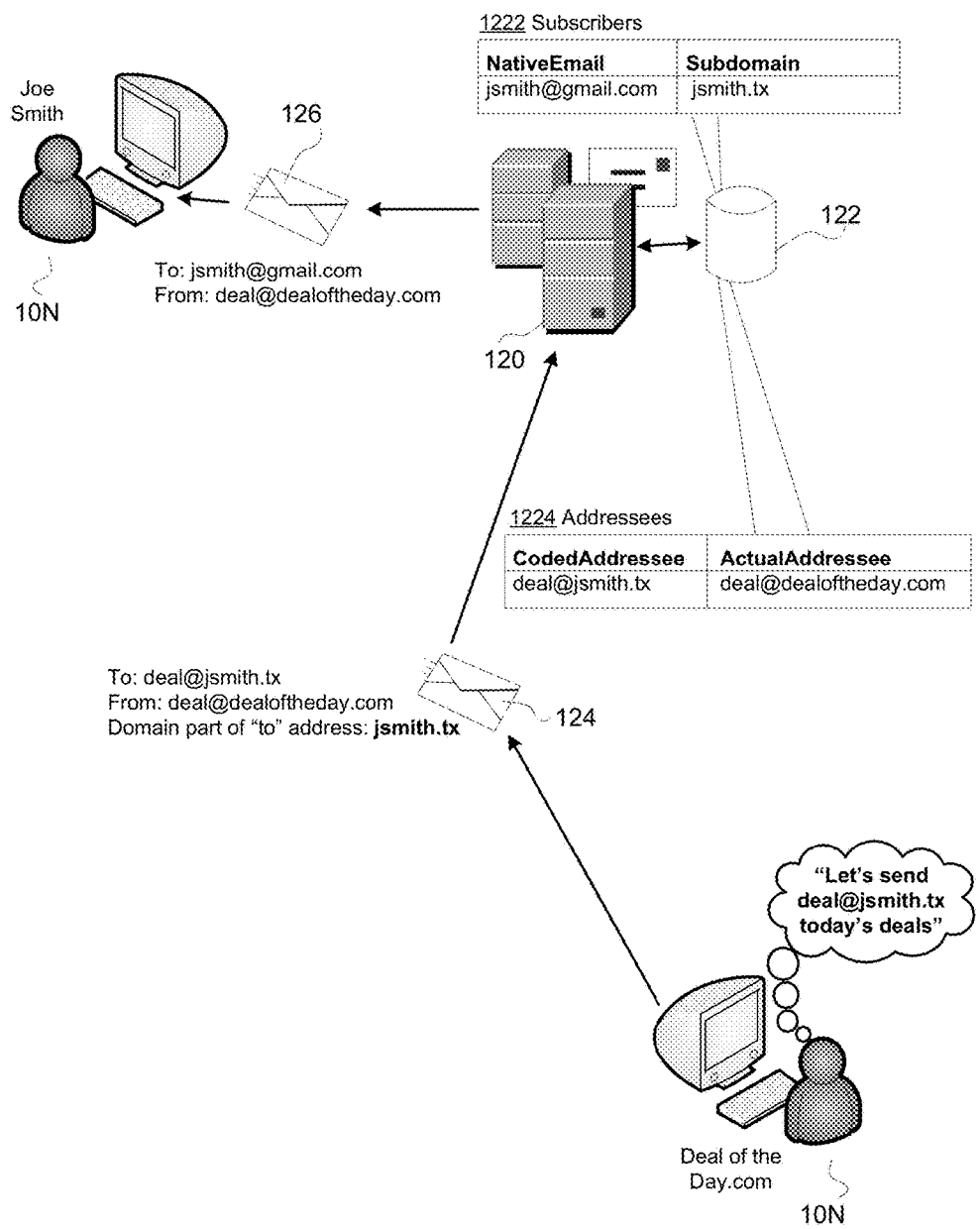
FIG. 9 depicts an alternative exemplary environment in which the methods and systems herein may be represented.

FIG. 9 depicts an alternative exemplary environment in which the methods and systems herein may be represented. FIG. 9 depicts a subscriber of the email redirection server receiving an email from an entity that does not know the subscriber's true, native email address. In the instant example, the organization "dealoftheday.com" wishes to send email to Joe Smith, except that "dealoftheday.com" only has the coded address for Joe Smith which was in the "from" address of an email that Joe Smith sent to "dealoftheday.com" via the email redirection server. An email 124 is addressed from "deal@dealoftheday.com" to "deal@jsmith.tx", whereby using the "jsmith.tx" subdomain the email is routed by the email system for "dealoftheday.com" (email system not shown) to the email redirection server 120 using the DNS infrastructure and other means disclosed elsewhere herein.

Upon receiving the email 124, the email redirection server 120 determines whether it is coming from one of its subscribers or going to one of its subscribers. The email redirection server will search its data store 122, perhaps in a table called "Subscribers" at 1222, for a record matching the subdomain contained in the domain part of the "to" line of the email address. In the instant example, the domain part of the "to" line of email 124 is "jsmith.tx". The email redirection server finds this value in the "Subdomain" column of the "Subscribers" table 1222 and correlates the match with subscriber Joe Smith, who has a corresponding true, native email address of "jsmith@gmail.com" found in the "NativeEmail" column of the record.

Next, the email redirection server 120 determines whether the email 124 is coming from Joe Smith or is intended to be delivered to Joe Smith by examining the "from" field of the email 124. In the instant example, the "from" address is "deal@dealoftheday.com" so the email redirection server determines that the email 124, not being from Joe Smith, must be intended to be delivered to Joe Smith. The email redirection server prepares a new email 126 and populates the address information. For a "to" address, it utilizes the true, native email address for Joe Smith previously found in the "NativeEmail" column of the matched record in the "Subscribers" 1222 table of the data store 122. For a "from" address for email 126, it copies the original "from" address from the email 124.

In some embodiments, the email redirection server 120 may also set a "reply-to" address by consulting an Addressees table 1224 of the data store 122. It may set the "reply-to" address to the "CodedAddressee" of "deal@jsmith.tx". By doing so, it ensures that if Joe Smith subsequently replies to the email 126, the reply will be delivered to the email redirection server, continuing to obfuscate Joe Smith's true address. In different embodiments, the "reply-to" address may be set by appending the subdomain associated with the subscriber to the "from" address from the email 124 (e.g. "deal@dealoftheday.com.jsmith.tx").

Figure 10:
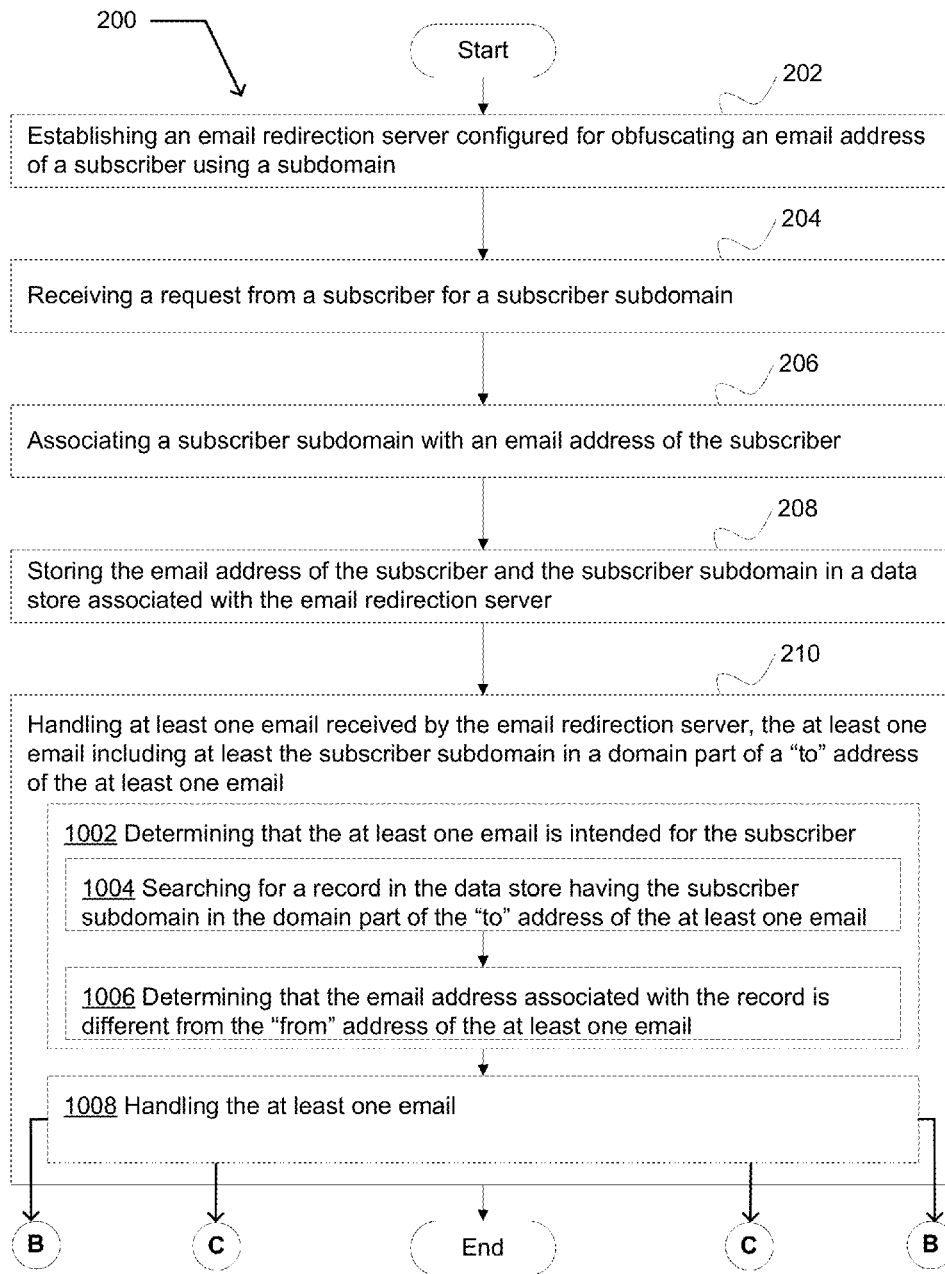
FIG. 10 depicts an alternative implementation of the operational process of FIG. 2.

FIG. 10 depicts an alternative implementation of the operational process of FIG. 2. In some embodiments, operation 210 may optionally include at least operation 1002 and operation 1008. At 1002, an operation may determine that the at least one email is intended for the subscriber. Operation 1002 may include operation 1004 and operation 1006. At 1004, an operation may search for a record in the data store having the subscriber subdomain in the domain part of the "to" address of the at least one email. At 1006, an operation may determine that the email address associated with the record is different from the "from" address of the at least one email. At 1008, an operation may further handle the at least one email.

Using the example depicted in FIG. 9, upon receiving an email 124, the email redirection server 120 must determine whether the email is coming from a subscriber to the email redirection server, or is intended to be delivered to a subscriber of the email redirection server. In operation 1002, it determines that the email 124 is intended to be delivered to the subscriber. An operation may do so by searching a data store 122 for a match of the domain part of the "to" address of the at least one email 124 with a native email address, and then comparing that native email address with the "from" address of the at least one email 124 (at operation 1004). If the "from" address matches the native email address from the matched record in the data store, then the email 124 is from the subscriber (similar to operation 506). If not, then the email is intended for the subscriber (at operation 1006). The operational flow continues to 1008, where the process handles the at least one email according to the determination that it is intended for the subscriber.

Figure 11:
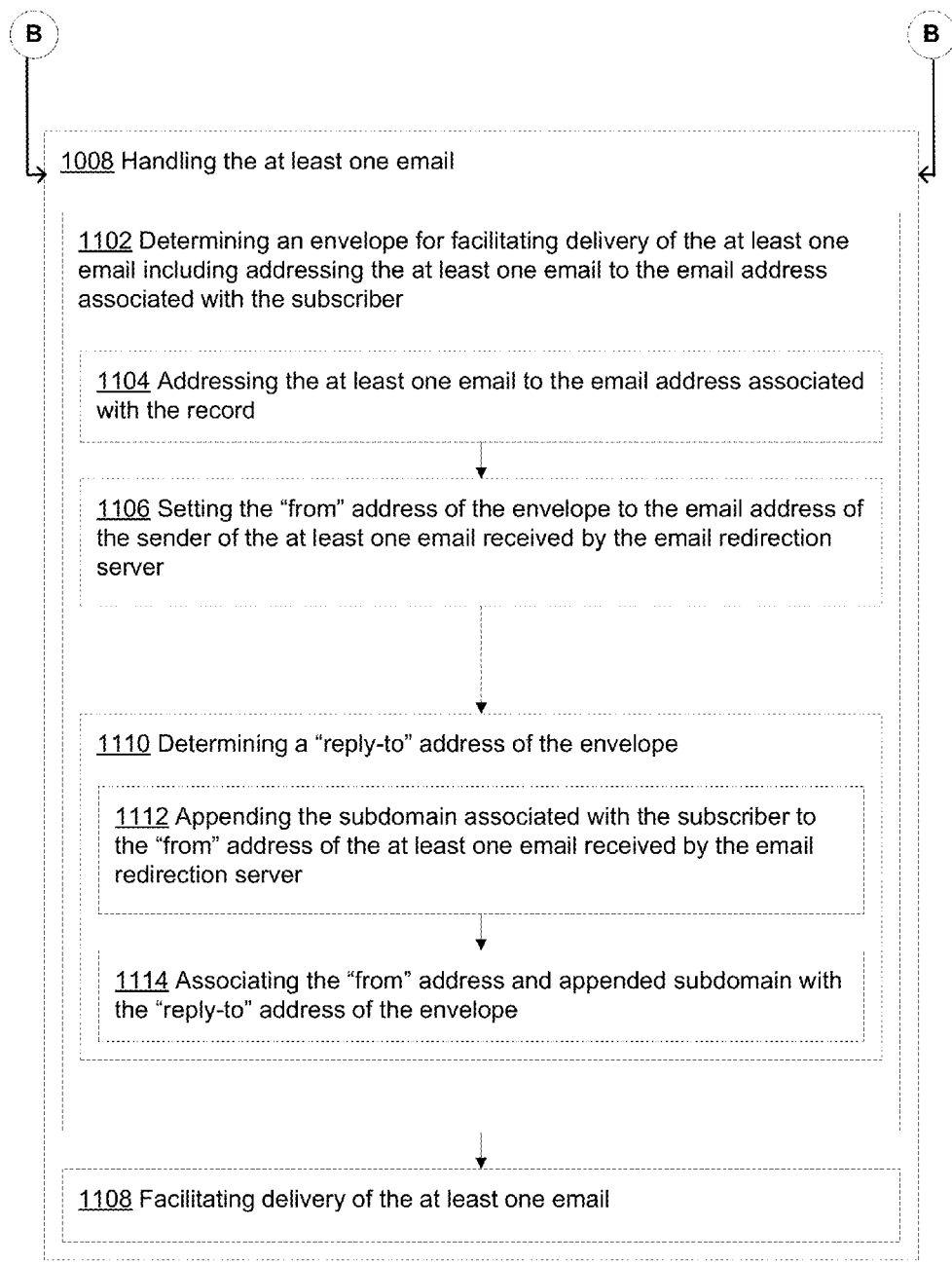
FIG. 11 depicts a continued implementation of the operational process of FIG. 10.

FIG. 11 depicts a continued implementation of the operational process of FIG. 10. In some embodiments, operation 1008 of handling the at least one email may have an optional operation 1102, and an optional operation 1108. At 1102, an operation may determine an envelope for facilitating delivery of the at least one email including addressing the at least one email to the email address associated with the subscriber. Operation 1102 may include an optional operation 1104, an optional operation 1106. At 1104, an operation may address the at least one email to the email address associated with the record. At 1106, an operation may set the "from" address of the envelope to the email address of the sender of the at least one email received by the email redirection server.

A further optional operation may include operation 1110. At 1110, an operation may determine a "reply-to" address of the envelope. Operation 1110 may include operation 1112 and operation 1114. At 1112, an operation may append the subdomain associated with the subscriber to the "from" address of the at least one email received by the email redirection server. At 1114, an operation may associate the "from" address and appended subdomain with the "reply-to" address of the envelope.

Returning to the example depicted in FIG. 9, once the email redirection server 120 has determined that the email 124 is intended for a subscriber, it must handle the at least one email. In some embodiments, handling the at least one email may include forwarding the at least email 124 as new email 126, including at 1102 determining an envelope for facilitating delivery of the at least one email 126 including addressing the at least one email 126 to the email address associated with the subscriber. That may include at 1104 addressing the at least one email to the email address associated with the record. For example, the email redirection server may set the "to" field of the email 126 to be the value contained in the "NativeEmail" column of the record corresponding to "jsmith.tx" retrieved from the "Subscribers" table 1222 from data store 122. That may also include at 1106 setting the "from" address of the envelope for email 126 to the email address of the sender of the at least one email 124 received by the email redirection server 120. For example, the email redirection server may set the "from" field of the email 126 to be the value contained in the "from" field of the email 124, which in this example is "deal@dealoftheday.com".

Optionally, the email redirection server may set a "reply-to" address in the envelope of the new email 126 (i.e. determining a "reply-to" address of the envelope at 1110). It may do so by appending the subdomain associated with the subscriber to the "from" address of the at least one email received by the email redirection server at 1112. For example, the operation may append "jsmith.tx" to "deal@dealoftheday.com" to result in "deal@dealoftheday.com.jsmith.tx". In a further operation 1114, the new appended address may be written to the "reply-to" field of the envelope for email 126 (i.e. associating the "from" address and appended subdomain with the "reply-to" address of the envelope at 1114).

Returning again to FIG. 9, in some embodiments the email redirection server 120 may associate a subscriber with one or more authentication and/or security rules for email intended for the subscriber. Joe Smith may wish the email redirection server 120 to authenticate incoming email 124, and handle unauthenticated emails differently from those that authenticate, according to a security rule. Handling email that does not authenticate, according to a security rule, may include forwarding emails that do not comply with a security rule to a different email address, placing emails that do not comply with a security rule in a spam folder, or deleting emails that do not comply with a security rule. Email that does authenticate according to at least one security rule may be permitted to be delivered to a native email address via a forwarded email 126.

Accordingly, Joe may establish security rules for email 124 received at the email redirection server 120 sent by third parties. In some embodiments, a security rule may be associated with an algorithm applied to the "to" address of the incoming email 124. For example, in some embodiments, a security rule may require that all incoming email must have a localpart of the "to" address of the incoming email 124 that ends in "m". According to such a rule, an email addressed to "dealm@jsmith.tx" would be processed by the email redirection server 120 and forwarded to "jsmith@gmail.com" via email 126. Additionally, email addressed to "deal@jsmith.tx" (lacking the "m" on the end of the localpart of the "to" address) could be processed according to the security rule, by deleting it, forwarding it elsewhere or placing it in a spam folder, among other possibilities.

Alternatively, Joe could invoke a security rule on the email redirection server 120 that associates a particular time period with incoming email 124. For example, Joe could instruct the email redirection server to only permit email received from "deal@dealoftheday.com" to be received for one week, or up to and including a particular date, or only in November and December of any given year, or using any other time period Joe wishes. The email redirection server may associate the particular time period with a particular sender, so that Joe may receive email from "deal@dealoftheday.com" for one time period and from a different sender for a different time period. In time periods other than those specified by the security rules, the email may be disposed of as described above (i.e. forwarded, moved to spam folder, or deleted).

A variety of security rules using hash algorithms on one or more of the fields of the envelope of the email 124, or using particular dates or other means are possible. Implementing a security rule for a particular sender may help the subscriber assure that spam email is disposed of by the email redirection server before it is even sent to the subscriber's true email account.

Figure 12:
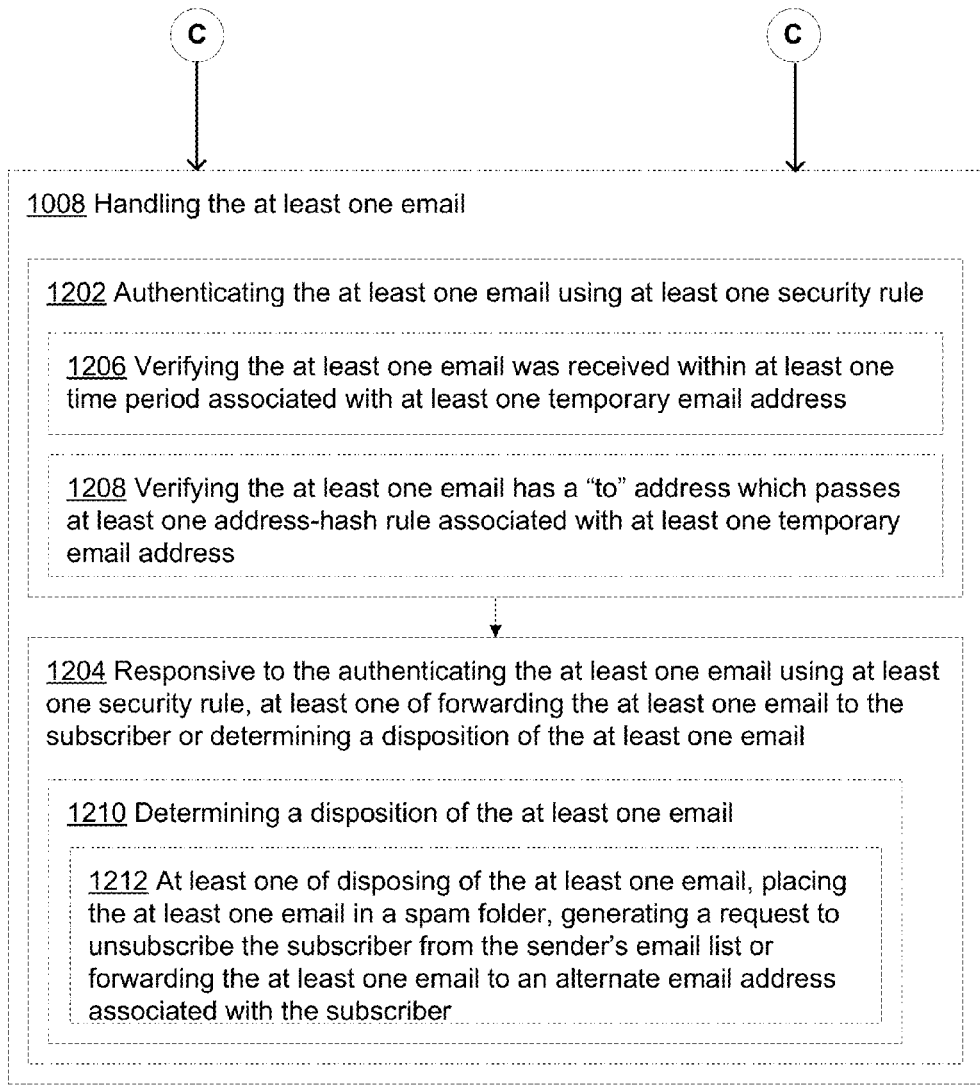
FIG. 12 depicts a continued implementation of the operational process of FIG. 10.

FIG. 12 depicts a continued implementation of the operational process of FIG. 10. Operation 1008 may include optional operation 1202 and optional operation 1204. At 1202, an operation may authenticate the at least one email using at least one security rule. At 1204, an operation may, responsive to the authenticating the at least one email using at least one security rule, at least one of forward the at least one email to the subscriber or determine a disposition of the at least one email. For example, referring to FIG. 9, the email redirection server 120, upon receiving incoming email 124 from "deal@dealoftheday.com", may apply a security rule associated with "deal@dealoftheday.com" to attempt to authenticate the incoming email 124. If the incoming email 124 is authenticated, the email is forwarded as email 126 to the subscriber 10N Joe Smith, which may include determining an appropriate envelope for sending email 126 using methods described elsewhere herein. If the incoming email is not authenticated, a disposition for the at least one email is determined.

Operation 1202 may include an optional operation 1206. At 1206, an operation may verify the at least one email was received within at least one time period associated with at least one temporary address. For example, the email redirection server 120, upon receiving incoming email 124 from "deal@dealoftheday.com", may apply a security rule associated with "deal@dealoftheday.com" to attempt to authenticate the incoming email 124, where the security rule states that email from "deal@dealoftheday.com" should only be authenticated in November or December.

Operation 1202 may include an optional operation 1208. At 1208, an operation may verify the at least one email has a "to" address which passes at least one address-hash rule associated with at least one temporary email address. For example, the email redirection server 120, upon receiving incoming email 124 from "deal@dealoftheday.com", may apply a security rule associated with "deal@dealoftheday.com" to attempt to authenticate the incoming email 124, where the security rule states that email from any sender at the domain "dealoftheday.com" domain must have a localpart that ends in "1".

Operation 1204 may include operation 1210. At 1210, an operation determines a disposition for the at least one email. Operation 1210 may include optional operation 1212. At 1212, an operation may include at least one of disposing of the at least one email, placing the at least one email in a spam folder, generating a request to unsubscribe the subscriber from the sender's email list or forwarding the at least one email to an alternate email address associated with the subscriber. For example, upon email 124 not being authenticated by the security rule applied by the email redirection server 120, generating and sending an automated email to the dealoftheday.com requesting dealoftheday.com unsubscribe "deal@jsmith.tx" from dealoftheday.com's email list, and deleting the email 124.

Figure 13:
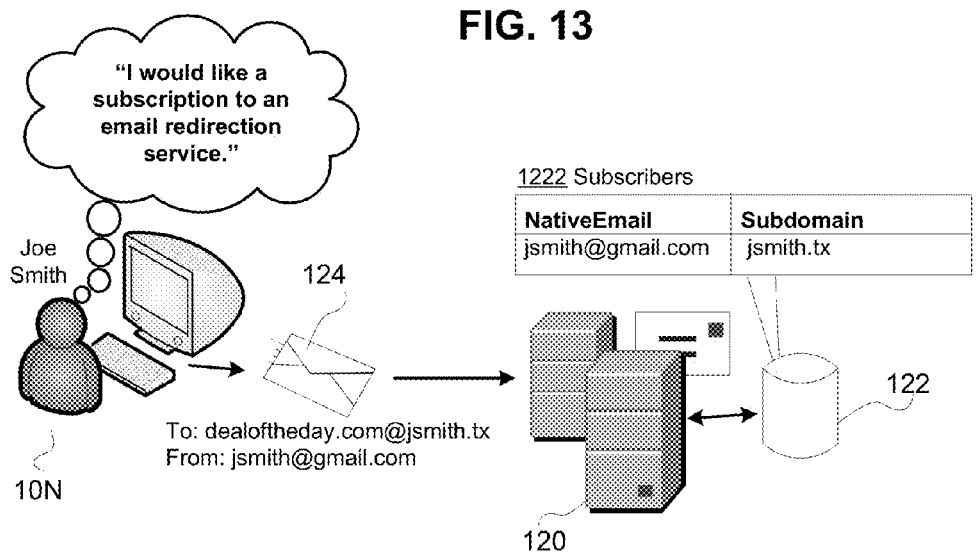
FIG. 13 depicts an alternative exemplary environment in which the methods and systems herein may be represented.

FIG. 13 depicts an alternative exemplary environment in which the methods and systems herein may be represented. In some embodiments, the email redirection server 120 can be configured to accept new subscriptions by email. For example, Joe Smith (jsmith@gmail.com) at 10N does not have a subscription to the email redirection server 120, but would like to see if the jsmith.tx subdomain is available on the email redirection server. Joe may send email 124 addressed to "deal$dealoftheday.com@jsmith.tx" which will arrive at the email redirection server via DNS lookups of MX records through methods disclosed elsewhere herein. Upon receiving the email 124, the email redirection server may search the data store to determine whether the email is received from or is intended to be delivered to a subscriber. The email redirection server may do so by searching, for example, a table "Subscribers" 1222 in data store 122 and looking in a column called "subdomain" for the domain part of the "to" address of the email 124 ("jsmith.tx" in this example). Upon the search of the data store 122 finding no records, the email redirection server will know that the email is neither coming from an existing subscriber nor intended for an existing subscriber. The email redirection server may then reply to email 124, facilitating the sender subscribing to the email redirection server. In different embodiments, the email redirection server may automatically establish a subscription for the new subscriber and process the incoming email 124 according to other methods described herein, including, for example, converting the localpart of the "to" address of the incoming email 124 to the "to" address for the forwarded email by replacing the "$" with an "@" or some other treatment of a special character intended to replace the "@" sign in an email address.

Figure 14:
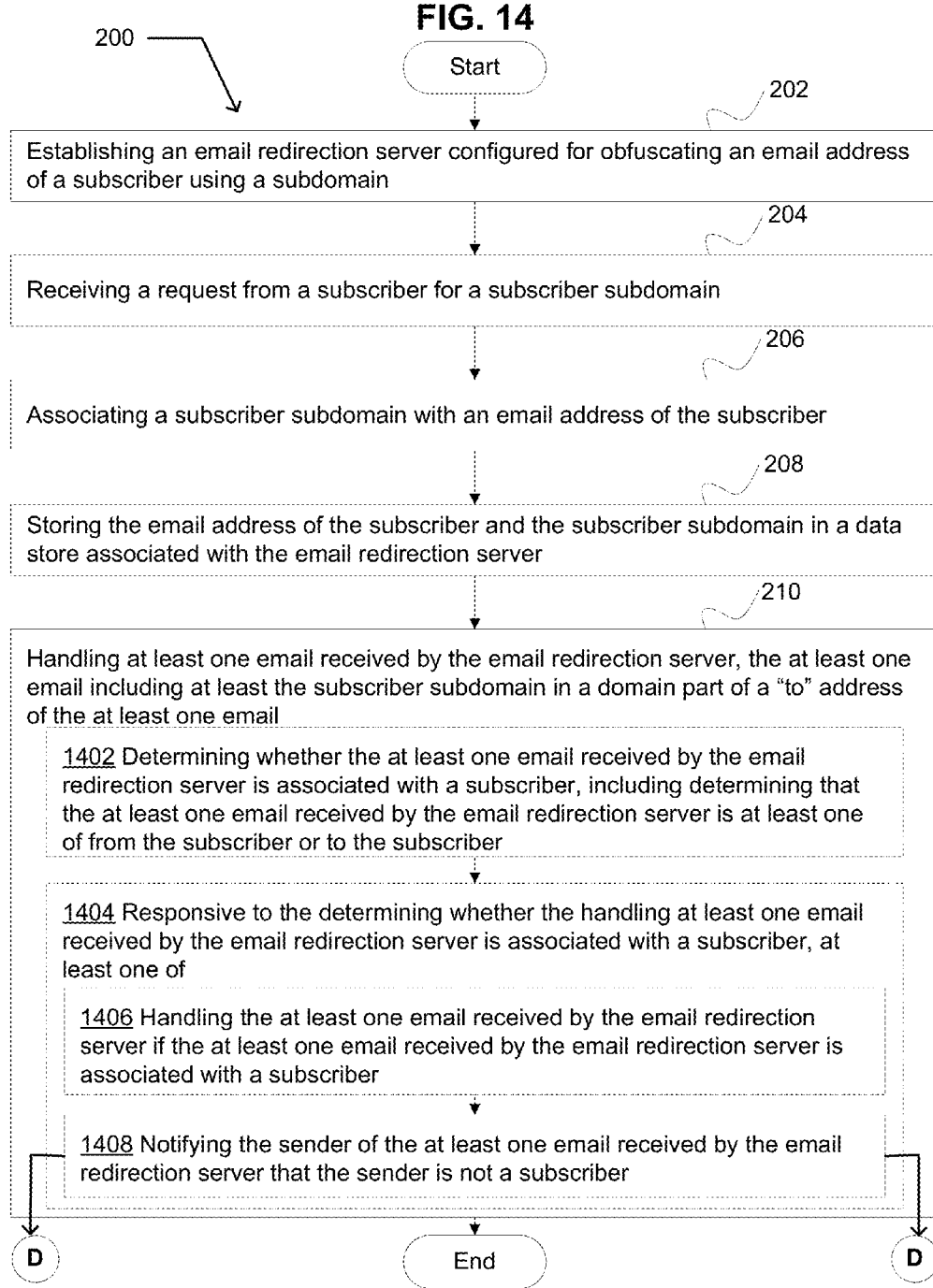
FIG. 14 depicts an alternative implementation of the operational process of FIG. 2.

FIG. 14 depicts an alternative implementation of the operational process of FIG. 2. Operation 210 may have an optional operation 1402 and an optional operation 1404. At 1402, an operation may determine whether the at least one email received by the email redirection server is associated with a subscriber, including determining that the at least one email received by the email redirection server is at least one of from the subscriber or to the subscriber. At 1404, an operation may, responsive to the determining whether the handling at least one email received by the email redirection server is associated with a subscriber, perform at least one of operational operation 1406 or operation 1408.

At 1406, an operation may handle the at least one email received by the email redirection server if the at least one email received by the email redirection server is associated with a subscriber. Operation 1406 may implicate methods described elsewhere herein. Alternatively, at 1408, an operation may notify the sender of the at least one email received by the email redirection server that the sender is not a subscriber.

Figure 15:
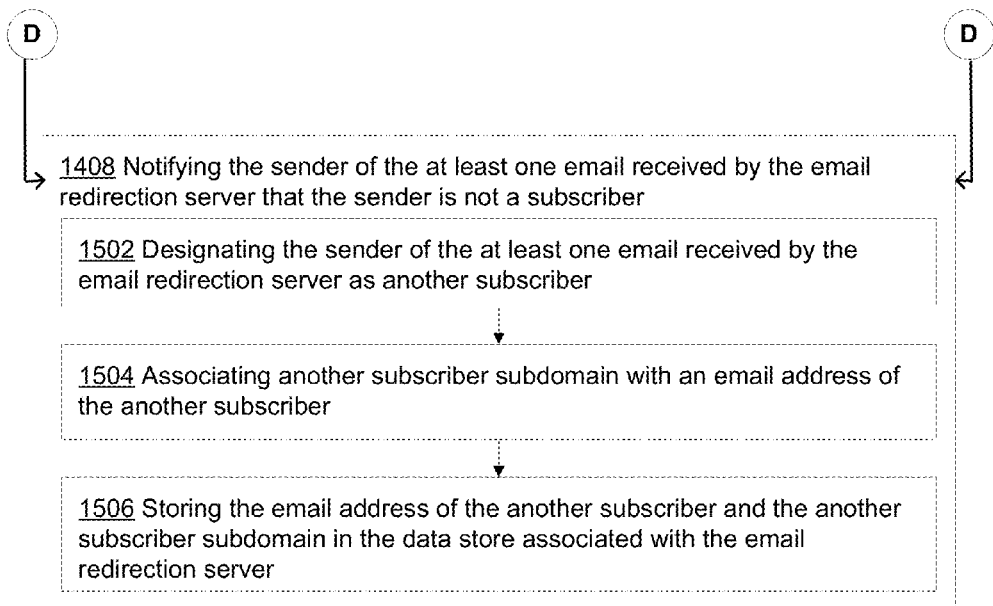
FIG. 15 depicts a continued implementation of the operational process of FIG. 14.

FIG. 15 depicts a continued implementation of the operational process of FIG. 14. Operation 1408 may include an optional operation 1502, optional operation 1406, and optional operation 1506. At 1502, an operation may designate the sender of the at least one email received by the email redirection server as another subscriber. At 1504, an operation may associate another subscriber subdomain with an email address of the another subscriber. At 1506, an operation may store the email address of the another subscriber and the another subscriber subdomain in the data store associated with the email redirection server. For example, the email redirection server 120, upon receiving email 124 from Joe Smith (who is not already a subscriber), may write a record in the data store 122, including writing a new record to a "Subscribers" table 1222. Writing the new record may include establishing a new subdomain to associate with Joe Smith such as "jsmith.tx" and writing that subdomain and Joe Smith's true, native email address "jsmith@gmail.com" to the data store 122. The email redirection server 120 may notify the new subscriber (Joe Smith) that a new subscription has been established, and may forward the original email 124 to a destination such as "deal@dealoftheday.com" via forwarded email 126 including setting the "from" field of email 126 to "deal@jsmith.tx", or may respond via other actions as disclosed elsewhere herein.

FIG. 16 depicts an alternative implementation of the operational process of FIG. 2. At 202, establishing an email redirection server configured for obfuscating an email address of a subscriber using a subdomain may include an optional operation 1602. At 1602, an operation establishes an email redirection server, the email redirection server having a hostname associated with a top-level domain, the email redirection server being configured for obfuscating an email address of a subscriber using a subdomain. In some embodiments, the email redirection server may be a subdomain of an existing domain, rather than a top-level domain. For example, an operator of an email redirection server called "happymail.com" provides subdomains to its subscribers in the form of "subscriberalias.happymail.com", where "subscriberalias" is a unique identifier for the subscriber. Assuming Joe Smith uses happymail.com as an email redirection service, his subdomain may be "jsmith.happymail.com". In other words, happymail.com may assign child domains of its parent domain happymail.com to its subscribers of the email redirection server. If subscriber Joe Smith wished to email "deal@dealoftheday.com" and obfuscate his email address, Joe would address an email 124 to "deal@jsmith.happymail.com". However, in different embodiments, to shorten the email address which Joe must type to invoke his subscriber subdomain at the email redirection server, the email redirection server may instead be implemented by using a top level domain such as ".tx" and assigning subdomains from the top level domain. Consequently, Joe Smith could receive the subdomain smithj.tx. Accordingly, at 206, an optional operation 1606 may be included. At 1606, an operation associates a subscriber subdomain, the subscriber subdomain being a child domain of the top-level domain, with an email address of the subscriber. For example, associating "jsmith.tx" with "jsmith@gmail.com". This operation may include associating an MX record in the DNS namespace with the subdomain "jsmith.tx" to ensure that email addressed to any mailbox in the "jsmith.tx" subdomain arrives at the email redirection server.

Further, the legacy DNS namespace definition does not include MX records for top-level domains. Accordingly, operation 202 also includes an optional operation 1604. At 1604 an operation associates an MX record in a name server associated with the top-level domain for at least one other top-level domain. In some embodiments, the email redirection service may provision a DNS server with an MX record including all known top-level domains as a subdomain of the top-level domain associated with the email redirection service. For example, if the top-level domain associated with the email redirection service is ".tx", the email redirection service will provision MX records for ".com.tx", ".net.tx", ".edu.tx", ".ca.tx" and for all other existing top-level domains. MX records according to this embodiment will facilitate email delivery to the email redirection service being addressed to "jsmith.gmail.com.tx" and the like, which normally would not be delivered since there could ordinarily be no MX record for ".tx" alone.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

While preferred and alternative embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method, comprising:
   establishing an email redirection server configured for obfuscating an email address of a subscriber using a subdomain;
   receiving a request from a subscriber for a subscriber subdomain;
   associating a subscriber subdomain with an email address of the subscriber;
   storing the email address of the subscriber and the subscriber subdomain in a data store associated with the email redirection server; and
   handling at least one email received by the email redirection server, the at least one email including at least the subscriber subdomain in a domain part of a "to" address of the at least one email, including at least:
      searching for a record in the data store having the subscriber subdomain in the domain part of the "to" address of the at least one email;
      if the email address associated with a record found responsive to the search matches the "from" address of the at least one email, determining an envelope for facilitating delivery of the at least one email including at least:
         determining an address for delivery of the at least one email in a local part of the "to" address of the at least one email; and
         obfuscating the email address of the subscriber;
      if the email address associated with a record found responsive to the search does not match the "from" address of the at least one email, determining an envelope for facilitating delivery of the at least one email including at least:
         addressing the at least one email to the email address associated with the record; and
         setting the "from" address of the envelope to the email address of the sender of the at least one email received by the email redirection server; and
      facilitating delivery of the at least one email;
   wherein at least one of the establishing, receiving, associating, storing or handling is at least partially implemented in hardware.

2. The method of claim 1, wherein handling at least one email received by the email redirection server, the at least one email including at least the subscriber subdomain in a domain part of a "to" address of the at least one email comprises:
   facilitating delivery of the at least one email at least one of from the subscriber or to the subscriber, the facilitating delivery of email including at least obfuscating the email address of the subscriber.

3. The method of claim 1, wherein obfuscating the email address of the subscriber comprises:
   searching for a record in the data store having the address for delivery of the at least one email in the local part of the "to" address of the at least one email; and
   responsive to the search, determining an address for the "from" field of the envelope, including:
      determining a new address for the "from" field of the envelope if the search finds no result; and
      choosing an address for the "from" field of the envelope from the email address associated with the search result if the search finds a result.

4. The method of claim 1, wherein handling at least one email received by the email redirection server, the at least one email including at least the subscriber subdomain in a domain part of a "to" address of the at least one email comprises:
   determining an envelope for facilitating delivery of the at least one email; and
   facilitating at least one tracking function associated with the at least one email.

5. The method of claim 1, wherein setting the "from" address of the envelope to the email address of the sender of the at least one email received by the email redirection server determining an envelope for facilitating delivery of the at least one email including addressing the at least one email to the email address associated with the subscriber further comprises:
   facilitating a "reply-to" function for the at least one email, including at least appending at least one of the subdomain associated with the subscriber or the subdomain associated with the email redirection server to the "from" address of the at least one email received by the email redirection server.

6. The method of claim 1, wherein handling the at least one email received by the email redirection server, the at least one email including at least the subscriber subdomain in a domain part of a "to" address of the at least one email comprises:
   authenticating the at least one email using at least one security rule; and
   responsive to the authenticating the at least one email using at least one security rule, at least one of forwarding the at least one email to the subscriber or determining a disposition of the at least one email.

7. The method of claim 6, wherein authenticating the at least one email using at least one security rule comprises:
   verifying the at least one email was received within at least one time period associated with at least one temporary email address.

8. The method of claim 6, wherein authenticating the at least one email using at least one security rule comprises:
   verifying the at least one email has a "to" address which passes at least one address-hash rule associated with at least one temporary email address.

9. The method of claim 6, wherein determining a disposition of the at least one email comprises:
   at least one of disposing of the at least one email, placing the at least one email in a spam folder, generating a request to unsubscribe the subscriber from the sender's email list or forwarding the at least one email to an alternate email address associated with the subscriber.

10. The method of claim 1, wherein handling at least one email received by the email redirection server, the at least one email including at least the subscriber subdomain in a domain part of a "to" address of the at least one email comprises:
- determining whether the at least one email received by the email redirection server is associated with a subscriber, including determining that the at least one email received by the email redirection server is at least one of from the subscriber or to the subscriber; and
- responsive to the determining whether the at least one email received by the email redirection server is associated with a subscriber, at least one of:
  - handling the at least one email received by the email redirection server if the at least one email received by the email redirection server is associated with a subscriber; or
  - notifying the sender of the at least one email received by the email redirection server that the sender is not a subscriber.

11. The method of claim 10, wherein notifying the sender of the at least one email received by the email redirection server that the sender is not a subscriber comprises:
- designating the sender of the at least one email received by the email redirection server as another subscriber;
- associating another subscriber subdomain with an email address of the another subscriber; and
- storing the email address of the another subscriber and the another subscriber subdomain in the data store associated with the email redirection server.

12. The method of claim 1, wherein establishing an email redirection server configured for obfuscating an email address of a subscriber using a subdomain comprises:
- establishing an email redirection server, the email redirection server having a hostname associated with a top-level domain, the email redirection server configured for obfuscating an email address of a subscriber using a subdomain.

13. The method of claim 12, wherein associating a subscriber subdomain with an email address of the subscriber comprises:
- associating a subscriber subdomain, the subscriber subdomain being a child domain of the top-level domain, with an email address of the subscriber.

14. The method of claim 12, further comprising:
- associating an MX record in a name server associated with the top-level domain for at least one other top-level domain.

15. A system, including:
- circuitry for establishing an email redirection server configured for obfuscating an email address of a subscriber using a subdomain;
- circuitry for receiving a request from a subscriber for a subscriber subdomain;
- circuitry for associating a subscriber subdomain with an email address of the subscriber;
- circuitry for storing the email address of the subscriber and the subscriber subdomain in a data store associated with the email redirection server; and
- circuitry for handling at least one email received by the email redirection server, the at least one email including at least the subscriber subdomain in a domain part of a "to" address of the at least one email, including at least:
  - circuitry for searching for a record in the data store having the subscriber subdomain in the domain part of the "to" address of the at least one email;
  - if the email address associated with a record found responsive to the search matches the "from" address of the at least one email, circuitry for determining an envelope for facilitating delivery of the at least one email including at least:
    - circuitry for determining an address for delivery of the at least one email in a local part of the "to" address of the at least one email; and
    - circuitry for obfuscating the email address of the subscriber;
  - if the email address associated with a record found responsive to the search does not match the "from" address of the at least one email, circuitry for determining an envelope for facilitating delivery of the at least one email including at least:
    - circuitry for addressing the at least one email to the email address associated with the record; and
    - circuitry for setting the "from" address of the envelope to the email address of the sender of the at least one email received by the email redirection server; and
  - circuitry for facilitating delivery of the at least one email.

16. A computer program product comprising one or more non-transitory computer-readable media bearing instructions for:
- establishing an email redirection server configured for obfuscating an email address of a subscriber using a subdomain;
- receiving a request from a subscriber for a subscriber subdomain;
- associating a subscriber subdomain with an email address of the subscriber;
- storing the email address of the subscriber and the subscriber subdomain in a data store associated with the email redirection server; and
- handling at least one email received by the email redirection server, the at least one email including at least the subscriber subdomain in a domain part of a "to" address of the at least one email, including at least:
  - searching for a record in the data store having the subscriber subdomain in the domain part of the "to" address of the at least one email;
  - if the email address associated with a record found responsive to the search matches the "from" address of the at least one email, determining an envelope for facilitating delivery of the at least one email including at least:
    - determining an address for delivery of the at least one email in a local part of the "to" address of the at least one email; and
    - obfuscating the email address of the subscriber;
  - if the email address associated with a record found responsive to the search does not match the "from" address of the at least one email, determining an envelope for facilitating delivery of the at least one email including at least:
    - addressing the at least one email to the email address associated with the record; and
    - setting the "from" address of the envelope to the email address of the sender of the at least one email received by the email redirection server; and
  - facilitating delivery of the at least one email.

17. A system, including:
- means for establishing an email redirection server configured for obfuscating an email address of a subscriber using a subdomain;
- means for receiving a request from a subscriber for a subscriber subdomain;

means for associating a subscriber subdomain with an email address of the subscriber;

means for storing the email address of the subscriber and the subscriber subdomain in a data store associated with the email redirection server; and means for handling at least one email received by the email redirection server, the at least one email including at least the subscriber subdomain in a domain part of a "to" address of the at least one email, including at least:

means for searching for a record in the data store having the subscriber subdomain in the domain part of the "to" address of the at least one email;

if the email address associated with a record found responsive to the search matches the "from" address of the at least one email, means for determining an envelope for facilitating delivery of the at least one email including at least:

means for determining an address for delivery of the at least one email in a local part of the "to" address of the at least one email; and means for obfuscating the email address of the subscriber;

if the email address associated with a record found responsive to the search does not match the "from" address of the at least one email, means for determining an envelope for facilitating delivery of the at least one email including at least:

means for addressing the at least one email to the email address associated with the record; and means for setting the "from" address of the envelope to the email address of the sender of the at least one email received by the email redirection server; and means for facilitating delivery of the at least one email.

* * * * *

UNITED STATES PATENT AND TRADEMARK OFFICE
CERTIFICATE OF CORRECTION

PATENT NO.        : 8,667,074 B1
APPLICATION NO.   : 13/787097
DATED             : March 4, 2014
INVENTOR(S)       : Bradford L. Farkas Page 1 of 1

It is certified that error appears in the above-identified patent and that said Letters Patent is hereby corrected as shown below:

In the Claims:

At Column 26, Lines 26-32, claim 5, please delete the words "…determining an envelope for facilitating delivery of the at least one email including addressing the at least one email to the email address associated with the subscriber further…"

A corrected preamble to Dependent Claim 5 including the foregoing correction will read:

> 5. The method of claim 1, wherein setting the "from" address of the envelope to the email address of the sender of the at least one email received by the email redirection server comprises:

Signed and Sealed this
Third Day of June, 2014

Michelle K. Lee
*Deputy Director of the United States Patent and Trademark Office*